(12) United States Patent
Radhakrishnan et al.

(10) Patent No.: US 8,978,397 B2
(45) Date of Patent: Mar. 17, 2015

(54) ABSORPTION HEAT PUMP EMPLOYING A HIGH/LOW PRESSURE EVAPORATOR/ABSORBER UNIT A HEAT RECOVERY UNIT

(75) Inventors: Balu Radhakrishnan, Maharashtra (IN); Babu Panneerselvam, Maharashtra (IN); Swapna Kulkarni, Maharashtra (IN)

(73) Assignee: Thermax Limited, Maharashtra (IN)

( * ) Notice: Subject to any disclaimer, the term of this patent is extended or adjusted under 35 U.S.C. 154(b) by 1372 days.

(21) Appl. No.: 12/760,669

(22) Filed: Apr. 15, 2010

(65) Prior Publication Data

US 2010/0270005 A1  Oct. 28, 2010

(30) Foreign Application Priority Data

Apr. 24, 2009  (IN) .......................... 1099/MUM/2009

(51) Int. Cl.
*F25B 15/00* (2006.01)
*F25B 29/00* (2006.01)

(52) U.S. Cl.
CPC .............. *F25B 29/006* (2013.01); *F25B 15/008* (2013.01); *Y02B 30/62* (2013.01)
USPC ............... 62/104; 62/238.3; 62/481

(58) Field of Classification Search
CPC .............................. F25B 15/008; F25B 29/006
USPC .............................. 62/238.3, 324.6, 476–497
See application file for complete search history.

(56) References Cited

U.S. PATENT DOCUMENTS

| | | | | |
|---|---|---|---|---|
| 4,290,273 A * | 9/1981 | Meckler | ........................ | 62/148 |
| 4,505,123 A * | 3/1985 | Kusakabe et al. | ............... | 62/148 |
| 6,050,083 A * | 4/2000 | Meckler | ..................... | 60/39.182 |
| 6,311,504 B1 * | 11/2001 | Yamazaki et al. | ............... | 62/141 |
| 7,347,057 B1 * | 3/2008 | Garrabrant et al. | ............. | 62/148 |
| 2006/0230776 A1 * | 10/2006 | Inoue et al. | .................. | 62/324.2 |

* cited by examiner

*Primary Examiner* — Allen Flanigan
*Assistant Examiner* — Filip Zec
(74) *Attorney, Agent, or Firm* — Cowan, Liebowitz & Latman, P.C.; Mark Montague

(57) ABSTRACT

An apparatus for providing heating and/or refrigeration effect and a method thereof is disclosed which provides simultaneous heating and refrigeration, only heating or only refrigeration, using a double-effect vapor absorption cycle or a single-effect vapor absorption cycle. The present invention comprises providing a heat input to an absorbent in a generator to obtain a concentrated absorbent which is fed to a set of absorbers which are located in co-operation with a set of evaporators provided with a condensed refrigerant, to obtain heating and/or refrigeration effect. The heat/energy used during the process is recovered by a plurality of heat exchangers such that the wastage of energy and utilities is minimized. The present invention substantially reduces the $CO_2$ emissions, thus is eco-friendly.

27 Claims, 13 Drawing Sheets

ABSORPTION HEAT PUMP EMPLOYING A HIGH/LOW PRESSURE EVAPORATOR/ABSORBER UNIT A HEAT RECOVERY UNIT

FIELD OF THE INVENTION

The present invention relates to a system for generating hot water.

Further, the present invention also relates to a system for obtaining refrigeration.

BACKGROUND OF THE INVENTION & PRIOR ART

Many industrial processes require hot water in the range of 60-90° C. for heating applications, like paint booth in automobile industry, paper industry, food industry, hotels, and the like. Extensive amount of energy is consumed during the heating application, which adds to the operating costs of the process. Generally, the energy sources used for heating water are fossil fuels including natural gas, liquefied petroleum gas, oil, or solid fuels. These fuels may be consumed directly or by the use of electricity, which may be derived from the above mentioned energy sources. Alternatively, hot water can be generated using solar energy, heat pumps, hot water heat recycling or geothermal heating. The hot water thus generated is sent to the application point where it loses the heat and is then recycled to the hot water generating system. These industries also normally require chilled water/refrigeration for the various process applications.

Refrigeration is commonly used in industries to liquefy gases like oxygen, nitrogen, propane and methane; in compressed air purification to condense water vapor from compressed air to reduce its moisture content; in oil refineries, chemical plants and petrochemical plants to maintain a low process temperature; and metallurgy industries to temper steel and cutlery. A heat pump is ideal for industrial applications that require both heating and cooling water, wherein the same mechanical refrigeration system can be used to obtain both the effects. With stringent pollution control regulations, application of heat pumps in industries has become important, since the technology helps to reduce emissions, improves efficiency, and limits the use of ground water for cooling. Also, heat pumps are efficient heating and cooling systems that significantly reduce the energy costs.

The heat pumps commonly used in industrial operations are based on a vapor compression or a vapor absorption cycle. Absorption heat pumps are thermally driven, which means that heat rather than mechanical energy is supplied to drive the cycle. Further, absorption heat pumps for space conditioning are often gas-fired, while industrial installations are usually driven by high-pressure steam or waste heat. The absorption systems utilize the ability of liquids or salts to absorb vapors of a working fluid to obtain the heating and the cooling effect.

The vapor compression cycle uses high grade energy from mechanical inputs while the vapor absorption cycle uses energy input from waste heat or heat derived from solar collectors. Thus, vapor absorption heat pumps substantially reduce the operating costs as they use low-grade waste heat. Also, the vapor absorption systems use non-ozone depleting refrigerants (water) and require much lesser electricity compared to the vapor compression systems. These systems are even more beneficial for industrial applications where waste heat can be used to generate steam/hot water.

The need for energy conservation has been highlighted by concerns about the environment, leading to development of energy efficient heating and cooling systems. Increased attention has been directed towards development of cost-effective and efficient heat pumps, that can provide heating and cooling, thus, reduce the energy consumption. As a result, the vapor absorption systems are gaining favor over conventional vapor compression heat pumps in industrial applications, as they use little energy and are environmental friendly.

The basic vapor absorption cycle employs two fluids, the refrigerant and the absorbent. Most commonly, lithium bromide (Li—Br)-water are used as the absorbent-refrigerant pair. In the absorption cycle the low-pressure refrigerant vapor is absorbed into the absorbent releasing a large amount of heat. The liquid refrigerant/absorbent solution is pumped to a high-operating pressure generator, where heat is provided from a gas burner, steam, hot water or hot gases. The heat causes the refrigerant to desorb from the absorbent and vaporize. These vapors flow to a condenser, where the heat is rejected and the refrigerant is condensed to a high-pressure liquid. This liquid refrigerant is then sent to a low-pressure evaporator, where it evaporates by absorbing heat and providing the cooling effect. The concentrated absorbent in the generator is then sent to the absorber, where it is recombined with the low-pressure refrigerant vapors returning from the evaporator, repeating the cycle. The vapor absorption machines can be used for heating applications by passing the hot refrigerant (water) vapors directly from the high temperature generator to the evaporator. These systems utilize heat source such as steam, hot water or hot gases leaving a boiler, turbine or engine generators.

Commercially, absorption heat pumps can be single-effect or multi-effect. The process discussed above discloses the working of a single-effect vapor absorption system. In single-effect absorption systems, the heat released during the chemical process of absorbing refrigerant vapor into the absorbent rich-stream, is rejected to the environment. In a multi-effect absorption system, some of this energy is utilized as the driving force to generate more refrigerant vapors. The more vapor generated per unit of heat input, greater the cooling capacity and higher the overall operating efficiency. A double-effect absorption system uses two generators including a high temperature and a low temperature generator, paired with a single condenser, absorber, and evaporator.

The conventional vapor absorption systems can only generate hot water up to 40-43° C., thus, limiting the applications of these systems in industries. Also, these systems can only be used for heating applications by passing the hot refrigerant (water) vapors directly from the high temperature generator to the evaporator. During this operation the vapor absorption system can only function as hot water generator and simultaneous refrigeration effect cannot be obtained. In conventional type of heating-cooling systems, switching between cooling operations and heating operations can be complicated and additional components like generators, pumps and chillers may be required. This adds to the initial capital investment and the operation and maintenance costs in terms of heat and electrical inputs and utilities. Therefore, a suitable system is required that will simultaneously provide heating and refrigeration effect without any additional components and costs.

Several efforts have been made for providing a vapor absorption heat pump which provides simultaneous heating and cooling effect, some of these works are listed in the prior art cited below:

U.S. Pat. No. 6,405,551B1 discloses a heating apparatus provided with a refrigeration cycle which can be used for heating, cooling and supplying hot water. The apparatus as disclosed in U.S. Pat. No. 6,405,551 comprises a compressor, a condenser, an evaporator and a first and a second heat exchanger. The first heat exchanger is always used as a heating medium for feed water or bath water while the second heat exchanger is used to provide either heating or cooling by selectively operating the heat exchanger as a condenser or an evaporator, by adequately switching the refrigeration ducts. The apparatus as disclosed in U.S. Pat. No. 6,405,551, is primarily used to provide hot water having temperature up to 60° C. and suitable for household applications.

WO2009/063494A2 discloses a Li—Br vapor absorption machine for providing refrigeration effect. The machine as disclosed in WO2009/063494 comprises of a high temperature generator connected to a furnace to receive a direct heat input by combustion of solid fuels. The machine as disclosed in WO2009/063494 is only used to provide a refrigeration effect. Large quantity of energy consumption and higher $CO_2$ emissions, are some of the drawbacks of the machine as disclosed in WO2009/063494.

Therefore, there is felt a need for a system that will simultaneously provide the heating and the cooling effect, utilize less energy, reduce $CO_2$ emissions, reduce the operating costs and is suitable for various applications.

OBJECTS OF THE INVENTION

An object of the present invention is to provide an apparatus for dual-purpose application of heating and refrigeration.

Another object of the present invention is to provide an apparatus which substantially reduces the quantity of energy utilized to obtain the heating and refrigeration simultaneously.

Still another object of the present invention is to provide a system that substantially reduces the quantity of fuel required for generating hot water as compared to the conventional hot water generators.

Yet another object of the present invention is to provide an apparatus for obtaining refrigeration which does not use chlorofluorocarbons and thus reduces the carbon dioxide emissions.

One more object of the present invention is to provide an apparatus which does not require additional electrical or heat input to provide the refrigeration.

Still one more object of the present invention is to provide an apparatus for obtaining heating and refrigeration which reduces the overall initial capital investment.

Yet one more object of the present invention is to provide an apparatus for providing heating and refrigeration which reduces the scope of utilities used in day-to-day handling operation thus reducing the operating costs.

An additional object of the present invention is to provide an apparatus which can be used to provide only heating or only refrigeration.

SUMMARY OF THE INVENTION

In accordance with the present invention, there is provided an apparatus for providing both heating and refrigeration, only refrigeration and only heating, under the conditions of high temperature heat input and low temperature heat input, said apparatus comprising a condenser, a vapor generator, a low pressure evaporator, a low pressure absorber, a high pressure evaporator, a high pressure absorber, a flash heat exchanger, a first low temperature heat exchanger, a second low temperature heat exchanger and a heat recovery unit, optionally comprising a low temperature generator, a drain heat exchanger and a high temperature heat exchanger;

characterized in that:
  the condenser is connected selectively to a set of equipment selected from a group consisting of the following sets: (i) the high pressure absorber, the flash heat exchanger and the drain heat exchanger; and (ii) the high pressure absorber, the heat recovery unit, the flash heat exchanger and the drain heat exchanger; and (iii) the high pressure absorber; and (iv) the high pressure absorber and the flash heat exchanger; and (v) the high pressure absorber, the heat recovery unit and the flash heat exchanger;
  the vapor generator is connected selectively to a set of equipment selected from a group consisting of the following sets: (i) the low temperature generator, the high temperature heat exchanger and the heat recovery unit; and (ii) the low temperature generator, the low pressure evaporator, the high temperature heat exchanger and the heat recovery unit; and (iii) the heat recovery unit, the first low temperature heat exchanger and the second low temperature heat exchanger;
  the low pressure evaporator cooperating with the low pressure absorber is connected selectively to a set of equipment selected from a group consisting of the following sets: (i) the high pressure evaporator; and (ii) the vapor generator;
  the low pressure absorber cooperating with the low pressure evaporator is connected selectively to a set of equipment selected from a group consisting of the following sets: (i) the high pressure evaporator, the first low temperature heat exchanger and the flash heat exchanger; and (ii) the high pressure evaporator, the first low temperature heat exchanger, the flash heat exchanger and the high temperature heat exchanger; and (iii) the high pressure absorber; and (iv) the flash heat exchanger, the first low temperature heat exchanger and the high temperature heat exchanger; and (v) the high pressure evaporator, the flash heat exchanger and the second low temperature heat exchanger; and (vi) the high pressure evaporator, the flash heat exchanger, the first low temperature heat exchanger and the second low temperature heat exchanger;
  the high pressure evaporator cooperating with the high pressure absorber is connected selectively to a set of equipment selected from a group consisting of the following sets: (i) the low pressure evaporator, the low pressure absorber and the flash heat exchanger; and (ii) the low pressure evaporator;
  the high pressure absorber cooperating with the high pressure evaporator is connected selectively to a set of equipment selected from a group consisting of the following sets: (i) the condenser, the heat recovery unit, the first low temperature heat exchanger, the flash heat exchanger and the second low temperature heat exchanger; and (ii) the condenser, the first low temperature heat exchanger, the flash heat exchanger and the second low temperature heat exchanger; and (iii) the condenser, the heat recovery unit, the first low temperature heat exchanger, the flash heat exchanger, the high temperature heat exchanger and the second low temperature heat exchanger; and (iv) the condenser and the low pressure absorber; and (v) the condenser, the heat recovery unit and the first low temperature heat exchanger; and (vi) the condenser and the first low temperature heat exchanger; and (vii) the condenser, the heat recovery unit, the flash heat exchanger and the first low temperature heat exchanger; and (viii) the condenser, the flash heat exchanger and the first low temperature heat exchanger;

the flash heat exchanger is connected selectively to a set of equipment selected from a group consisting of the following sets: (i) the condenser, the high pressure evaporator, the low pressure absorber, the high pressure absorber and the drain heat exchanger; and (ii) the low pressure absorber and the drain heat exchanger; and (iii) the condenser, the high pressure evaporator, the low pressure absorber and the second low temperature heat exchanger; and (iv) the condenser, the high pressure evaporator, the low pressure absorber, the high pressure absorber and the second low temperature heat exchanger;

the first low temperature heat exchanger is connected selectively to a set of equipment selected from a group consisting of the following sets: (i) the low pressure absorber, the high pressure absorber and the second low temperature heat exchanger; and (ii) the low pressure absorber and the second low temperature heat exchanger; and (iii) the high pressure absorber and the vapor generator; and (iv) the low pressure absorber, the high pressure absorber and the vapor generator;

the second low temperature heat exchanger is connected selectively to a set of equipment selected from a group consisting of the following sets: (i) the high pressure absorber, the first low temperature heat exchanger, the high temperature heat exchanger and the low temperature generator; and (ii) the first low temperature heat exchanger and the high temperature heat exchanger; and (iii) the low pressure absorber, the flash heat exchanger and the vapor generator;

the heat recovery unit is connected selectively to a set of equipment selected from a group consisting of the following sets: (i) the high pressure absorber and the vapor generator; and (ii) the condenser and the vapor generator; and (iii) the vapor generator;

the low temperature generator is connected selectively to a set of equipment selected from a group consisting of the following sets: (i) the vapor generator, the high temperature heat exchanger, the drain heat exchanger and the second low temperature heat exchanger; and (ii) the vapor generator, the drain heat exchanger and the second low temperature heat exchanger;

the drain heat exchanger is connected selectively to a set of equipment selected from a group consisting of the following sets: (i) the low temperature generator, the condenser, the high temperature heat exchanger and the flash heat exchanger; and (ii) the low temperature generator, the condenser and the flash heat exchanger; and (iii) the flash heat exchanger and the high temperature heat exchanger; and the high temperature heat exchanger is connected selectively to a set of equipment selected from a group consisting of the following sets: (i) the vapor generator, the low temperature generator, the second low temperature heat exchanger and the drain heat exchanger; and (ii) the vapor generator, the low temperature generator and the second low temperature heat exchanger; and (iii) the vapor generator, the second low temperature heat exchanger and the drain heat exchanger; and (iv) the vapor generator, the second low temperature heat exchanger, the low pressure absorber and the high pressure absorber; and (v) the vapor generator, the low pressure absorber, second low temperature heat exchanger and the drain heat exchanger.

BRIEF DESCRIPTION OF THE ACCOMPANYING DRAWINGS

The invention will now be described with reference to the accompanying drawings, in which.

DETAILED DESCRIPTION OF THE ACCOMPANYING DRAWINGS

The invention will now be described with reference to the accompanying drawings which do not limit the scope and ambit of the invention. The description provided is purely by way of example and illustration.

Figure 1:
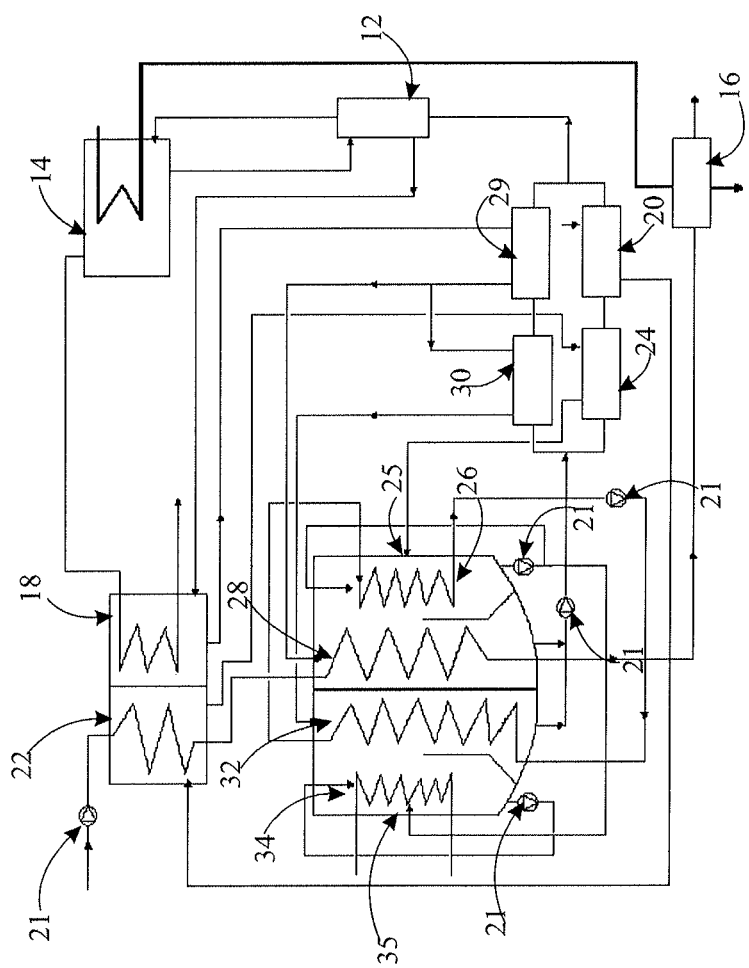
FIG. 1 illustrates a schematic diagram of an apparatus for providing heating and refrigeration using a double-effect vapor absorption cycle.

The present invention envisages an apparatus for providing both heating and refrigeration, only refrigeration, and only heating, and a method thereof. The apparatus in accordance with the present invention comprises a condenser (COND), a vapor generator (GEN), a low pressure evaporator (EVAL), a low pressure absorber (ABSL), a high pressure evaporator (EVAH), a high pressure absorber (ABSH), a flash heat exchanger (FHE), a first low temperature heat exchanger (LTHE1), a second low temperature heat exchanger (LTHE2) and a heat recovery unit (HR), further optionally comprising a low temperature generator (LTG), a drain heat exchanger (DHE) and a high temperature heat exchanger (HTHE). The refrigerant-absorbent pair used in the apparatus of the present invention is selected from a group consisting of water-lithium bromide, ammonia-water and the like In accordance with one embodiment of the present invention, FIG. 1 illustrates a schematic diagram of an apparatus for providing both heating and refrigeration using a double-effect vapor absorption cycle, under the conditions of high temperature heat input, wherein the refrigerant-absorbent mixture, typically Li—Br and water, first enters into the vapor generator and hot water first enters the condenser and then the high pressure absorber. The embodiment as disclosed in FIG. 1, comprises feeding a refrigerant-absorbent solution from the HTHE 12 to the GEN 14. The GEN 14 is provided with a high temperature heat input having temperature in the range of 130-220° C., which boils the refrigerant-absorbent solution entering the GEN 14 to generate a concentrated absorbent solution and refrigerant vapors. The GEN 14 provided in the double-effect vapor absorption cycle is typically a high temperature generator. The high temperature heat input used in the GEN 14 typically consists of steam, superheated water, by combustion of fuel or exhaust gas. After extracting heat from the heat input in the GEN 14, the left over heat is reclaimed in the HR 16, which is provided to reclaim optimum quantity of heat input in the double-effect vapor absorption cycle and utilize it to enhance the heating effect thus provided.

The concentrated absorbent solution from the GEN 14 is sent to the HTHE 12 for losing the heat. The concentrated absorbent solution from the HTHE 12 is fed to the LTG 18. The refrigerant vapors after leaving the GEN 14 are sent through the heat exchanger tubes of the LTG 18. The vapors act as a further heating source for the concentrated absorbent solution, thus concentrating it further and consequently condensing the vapor stream to produce a refrigerant condensate which is sent to the DHE 20 for further extraction of heat and refrigerant vapors. The concentrated absorbent solution, thus obtained in the LTG 18 is the most concentrated absorbent solution achieved using the present process cycle. The concentrated absorbent solution from the LTG 18 is sent to the LTHE2 29, where the heat gained by the absorbent solution in the LTG 18 from the refrigerant vapors is extracted. The concentrated absorbent solution stream leaving the LTHE2 29 is bifurcated, wherein the first stream is sent to the LTHE1 30 for further extraction of heat and the second stream is fed to the ABSH 28.

The refrigerant condensate after passing through the DHE 20 and the refrigerant vapors from the LTG 18 are sent to the COND 22, where the refrigerant is further condensed. The step of primary condensing the refrigerant vapors before passing through the COND 22 helps in reducing the condenser duty. Hot water, having temperature in the range of 45-90° C., is pumped by pumping means 21 to the COND 22, through the heat exchanger tubes of the COND 22. The condensed refrigerant leaving the COND 22 is passed through the FHE 24. In the FHE 24, the condensed refrigerant is further cooled before feeding it to the EVAH 26; this minimizes the refrigerant flash losses in the EVAH 26 that can be caused due to the high temperature of the condensed refrigerant, thus, improving the efficiency of the apparatus.

In FIG. 1, numeral 25 represents a shell comprising the ABSH 28 and the EVAH 26. By maintaining a high-pressure in the ABSH 28 and the EVAH 26 in the shell 25, the condensed refrigerant is vaporized. The EVAH 26 is provided with water through the evaporator heat exchanger tubes. During the cycle, water exchanges heat with the condensed refrigerant in the EVAH 26. The condensed refrigerant fed to the EVAH 26 absorbs heat from water circulating through the evaporator tubes and forms refrigerant vapors. The refrigerant vapors thus released in the EVAH 26 are absorbed by the concentrated absorbent solution fed to the ABSH 28. After absorbing the refrigerant vapors, the concentrated absorbent solution in the ABSH 28 becomes dilute or weak and exits the ABSH 28 as the refrigerant-absorbent solution. Heat is liberated during the refrigerant vapor absorption process, referred to as the heat of dilution.

The hot water from the COND 22 is fed to the ABSH 28 through the heat exchanger tubes of the absorber, wherein the hot water gains the heat of dilution produced during the refrigerant vapor absorption process. The hot water leaving the ABSH 28 has a temperature in the range of 50-98° C. and is used for the heating applications. The hot water exiting the ABSH 28 is fed to the HR 16. In the HR 16, the hot water further extracts heat from the heat input fed to the GEN 14, producing further heated water, which is used for subsequent applications.

In FIG. 1, numeral 35 represents a shell comprising the ABSL 32 and the EVAL 34. The concentrated absorbent solution after losing heat in the LTHE1 30 is fed to the ABSL 32. The water from the EVAH 26 is circulated to the ABSL 32 by the pumping means 21. The EVAL 34 is fed with water having temperature in the range of 5-40° C. through the heat exchanger tubes. The condensed refrigerant from the FHE 24 after passing through the EVAH 26 is divided into two streams: the first stream is sent to the EVAL 34 via the pumping means 21 and the second stream is recycled back to the EVAH 26 via the pumping means 21. By maintaining a low-pressure in the ABSL 32 and the EVAL 34 in the shell 35, the condensed refrigerant vaporizes at a low temperature. The vaporizing causes the refrigerant to absorb heat from the water circulated through the tubes of the EVAL 34, thus lowering the temperature of the refrigerant and producing refrigerant vapors and cooling the water circulated therein up to a temperature of 0-35° C. The refrigerant vapors produced in the EVAL 34 are absorbed by the concentrated absorbent solution fed to the ABSL 32. The concentrated absorbent solution after absorbing the refrigerant vapors becomes dilute. The process of refrigerant absorption produces heat of dilution which is absorbed by the water circulated through the heat exchanger tubes of the ABSL 32. The water gains heat in the ABSL 32 is recycled to the EVAH 26 for losing the heat, thus completing the loop. The refrigerant stream leaving the EVAL 34 is recycled back to the EVAL 34 via the pumping means 21.

The refrigerant-absorbent solutions generated in the ABSL 32 and the ABSH 28 are mixed after exiting the shell 35 and the shell 25, respectively. The mixture of refrigerant-absorbent solution is fed through the pumping means 21 to the heat exchangers. The refrigerant-absorbent solution stream from the ABSL 32 and the ABSH 28 is bifurcated, wherein the first stream enters the LTHE1 30 and the second stream enters the FHE 24. In the LTHE1 30 the refrigerant-absorbent solution extracts heat from the concentrated absorbent solution fed therein. From the LTHE1 30 the refrigerant-absorbent solution is fed to the LTHE2 29 wherein the refrigerant-absorbent solution further extracts heat from the concentrated absorbent solution fed to the LTHE2 29 from the LTG 18. The step helps in reducing the temperature of the concentrated absorbent solution from the LTG 18 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26. After passing through the FHE 24 the refrigerant-absorbent solution is fed to the DHE 20. In the DHE 20 the refrigerant-absorbent solution extracts heat from the refrigerant condensate received therein from the LTG 18, wherein the temperature of the refrigerant-absorbent solution increases and the refrigerant condensate is suitably cooled before feeding to the COND 22.

The heated refrigerant-absorbent solution leaving the LTHE2 29 and DHE 20 is mixed and fed to the HTHE 12. In the HTHE 12 the refrigerant-absorbent solution absorbs heat from the concentrated absorbent solution leaving the GEN 14. The refrigerant-absorbent solution after gaining heat in the HTHE 12 is fed to the HTG 14, where the refrigerant-absorbent solution is boiled to generate a concentrated absorbent solution. The concentrated absorbent solution from the HTHE 12 is fed to the LTG 18 after exchanging heat with the refrigerant-absorbent solution. The apparatus as disclosed in the FIG. 1 is provided with programmable logic controls (PLC) (not shown in the figure) to provide an automated control over the process cycle.

Figure 2:
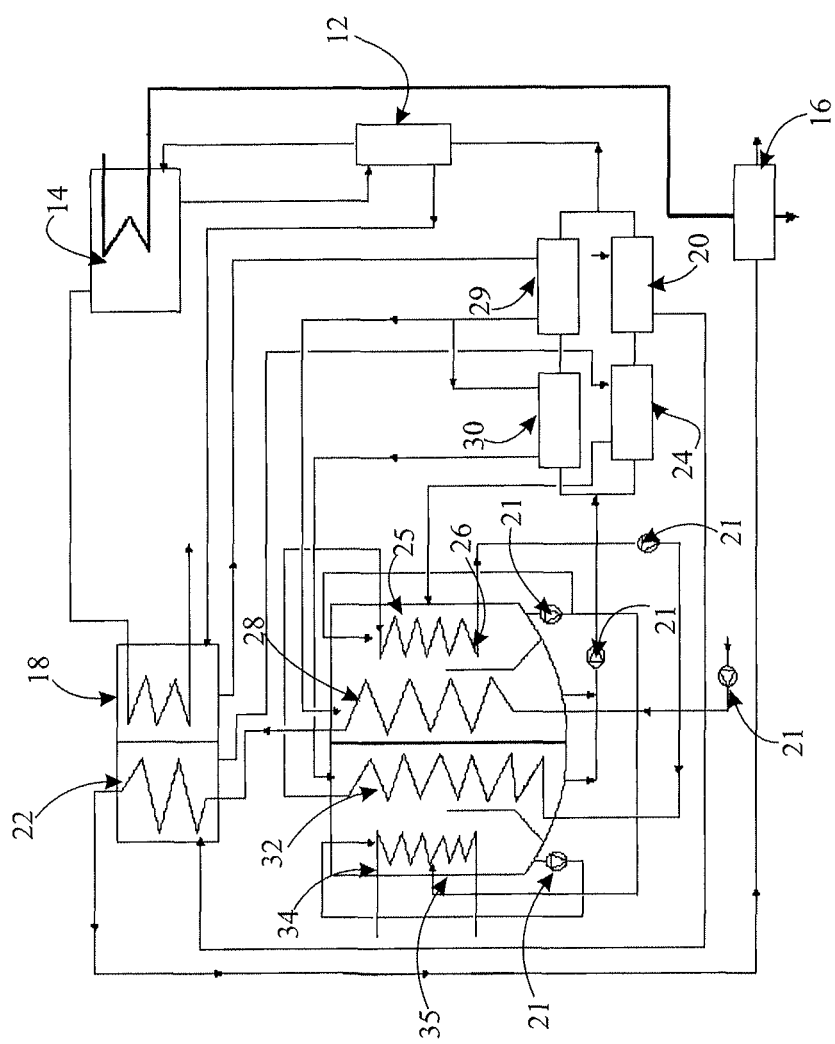
FIG. 2 illustrates an alternative schematic diagram of the apparatus for providing heating and refrigeration using a double-effect vapor absorption cycle.

In accordance with another embodiment of the present invention, FIG. 2 illustrates an alternative schematic diagram of the apparatus for providing both heating and refrigeration using a double-effect vapor absorption cycle, under conditions of high temperature heat input, wherein the refrigerant-absorbent mixture, typically Li—Br and water, first enters the vapor generator and the hot water first enters the high pressure absorber and then flows into the condenser. The embodiment as disclosed in FIG. 2 operates in a similar manner as aforementioned in the FIG. 1. However, in the embodiment as disclosed in FIG. 2, the hot water with temperature in the range of 45-90° C. is first pumped through the pumping means 21 to the heat exchanger tubes of the ABSH 28 where in the ABSH 28 the hot water absorbs the heat of dilution produced during the refrigerant vapor absorption process in the shell 25. The hot water exiting the ABSH 28 is then fed to the COND 22 wherein the hot water having temperature lower than the condensed refrigerant received in the COND 22 from the DHE 20 is used to further condense the condensed refrigerant received therein, thus generating a further condensed refrigerant and further heated water having temperature in the range of 50-98° C. which is used for the heating applications. The heated water from the COND 22 is fed to the HR 16. In the HR 16, the hot water further extracts heat from the heat input fed in the GEN 14, producing further hot water having which is used for subsequent applications.

Figure 3:
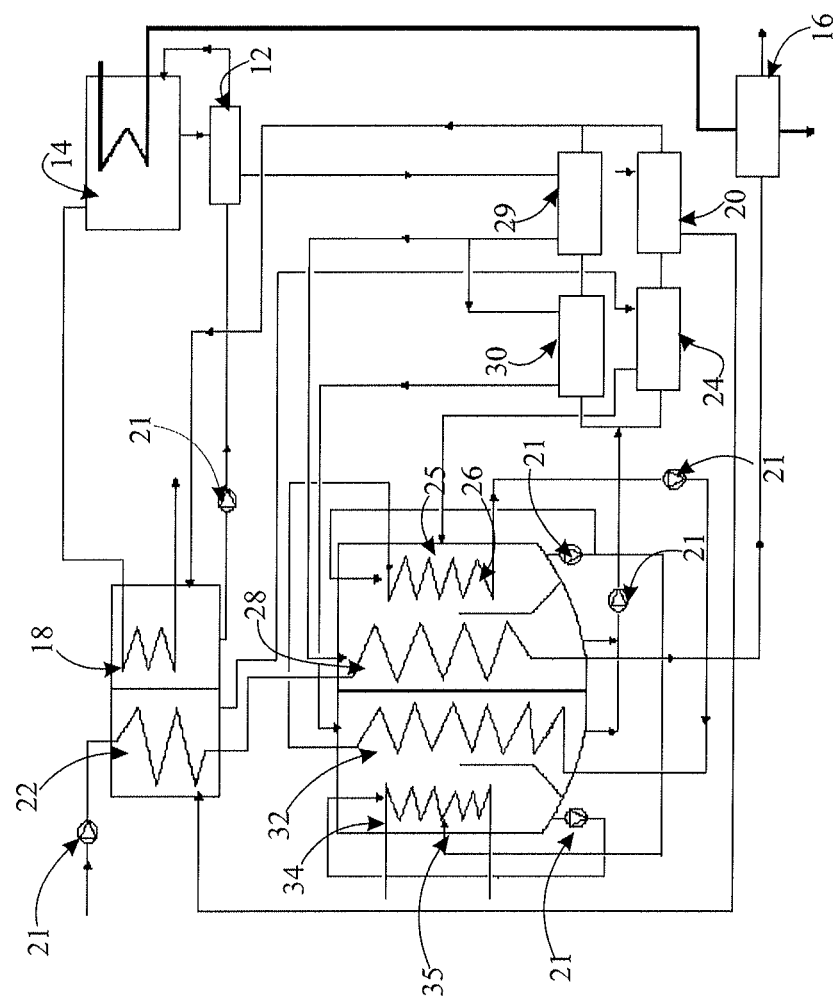
FIG. 3 illustrates one more alternative schematic diagram of the apparatus for providing heating and refrigeration using a double-effect vapor absorption cycle.

In accordance with still another embodiment of the present invention, FIG. 3 illustrates one more alternative schematic diagram of the apparatus for providing both heating and refrigeration using a double-effect vapor absorption cycle, wherein the refrigerant-absorbent mixture, typically Li—Br and water, first enters the low temperature generator and the hot water first enters the condenser and then flows into the high pressure absorber. The embodiment as disclosed in FIG. 3, comprises feeding a refrigerant-absorbent solution to the LTG 18, wherein in the LTG 18 refrigerant vapors are used to provide a heat source to the refrigerant-absorbent solution received therein, such that a moderately concentrated refrigerant-absorbent solution and refrigerant condensate and vapors are generated in the LTG 18 wherein the refrigerant condensate is sent to the DHE 20 for further extraction of heat.

The moderately concentrated solution from the LTG 18 is received in the HTHE 12 where it gains heat to produce a heated moderately concentrated absorbent solution. The heated moderately concentrated absorbent solution from the HTHE 12 is sent to the GEN 14 where using a high temperature heat input having temperature in the range of 130-220° C. the moderately concentrated absorbent solution is boiled to form a concentrated absorbent and refrigerant vapors. The GEN 14 provided in the double-effect vapor absorption cycle is typically a high temperature generator. The high temperature heat input used in the GEN 14 typically consists of steam, superheated water, by combustion of fuel or exhaust gas. After extracting heat from the heat input in the GEN 14, the left over heat is reclaimed in the HR 16, which is provided to reclaim optimum quantity of heat input in the double-effect vapor absorption cycle and utilize it to enhance the heating thus provided.

The refrigerant vapors from the GEN 14 are fed to the LTG 18 which are used to provide the heat source to the refrigerant-absorbent solution and produce the moderately concentrated absorbent. The concentrated absorbent from the GEN 14 is passed through the HTHE 12 where it exchanges heat with the moderately concentrated solution received therein, thus, heating the moderately concentrated solution. The concentrated absorbent, thus obtained in the GEN 14 is the most concentrated absorbent solution achieved using the present process cycle. The concentrated absorbent from the GEN 14 is sent to the LTHE2 29, where the heat from the concentrated absorbent is further extracted to generate a cooled concentrated absorbent. The cooled concentrated absorbent leaving the LTHE2 29 is bifurcated, wherein the first stream is sent to the LTHE1 30 for further extraction of heat to generate a further cooled concentrated absorbent and the second stream of the cooled concentrated absorbent is fed to the ABSH 28.

The refrigerant condensate after passing through the DHE 20 and the refrigerant vapors from the LTG 18 are sent to the COND 22, where the refrigerant is further condensed. The step of primary condensing the refrigerant vapors before passing through the COND 22 helps in reducing the condenser duty. Hot water, having temperature in the range of 45-90° C., is pumped by pumping means 21 to the COND 22, through the heat exchanger tubes of the COND 22. The condensed refrigerant leaving the COND 22 is passed through the FHE 24. In the FHE 24, the condensed refrigerant is further cooled before feeding it to the EVAH 26; this minimizes the refrigerant flash losses in the EVAH 26 that can be caused due to the high temperature of the condensed refrigerant, thus, improving the efficiency of the apparatus.

In FIG. 3, numeral 25 represents a shell comprising the ABSH 28 and the EVAH 26. By maintaining a high-pressure in the ABSH 28 and the EVAH 26 in the shell 25, the condensed refrigerant is vaporized. The EVAH 26 is provided with water through the evaporator heat exchanger tubes. During the cycle, the water exchanges heat with the condensed refrigerant in the EVAH 26. The condensed refrigerant fed to the EVAH 26 absorbs heat from the water circulating through the evaporator tubes and forms refrigerant vapors. The refrigerant vapors thus released in the EVAH 26 are absorbed by the concentrated absorbent solution fed to the ABSH 28. After absorbing the refrigerant vapors, the concentrated absorbent solution in the ABSH 28 becomes dilute or weak and exits the ABSH 28 as the refrigerant-absorbent solution. Heat is liberated during the refrigerant vapor absorption process, referred to as the heat of dilution.

The hot water from the COND 22 is fed to the ABSH 28 through the heat exchanger tubes of the absorber, wherein the hot water gains the heat of dilution produced during the refrigerant vapor absorption process. The hot water leaving the ABSH 28 has a temperature in the range of 50-98° C. and is used to provide the heating applications. The hot water exiting the ABSH 28 is fed to the HR 16. In the HR 16, the hot water further extracts heat from the heat input fed to the GEN 14, producing further hot water.

In FIG. 3, numeral 35 represents a shell comprising the ABSL 32 and the EVAL 34. The cooled concentrated absorbent after further losing heat in the LTHE1 30 forms a further cooled concentrated absorbent which is fed to the ABSL 32. The water from the EVAH 26 is circulated to the ABSL 32 by the pumping means 21. The EVAL 34 is fed with water having temperature in the range of 5-40° C. through the heat exchanger tubes. The condensed refrigerant from the FHE 24 after passing through the EVAH 26 is divided into two streams: the first stream is sent to the EVAL 34 via the pumping means 21 and the second stream is recycled back to the EVAH 26 via the pumping means 21. By maintaining a low-pressure in the ABSL 32 and the EVAL 34 in the shell 35, the condensed refrigerant vaporizes at a low temperature. The vaporizing causes the refrigerant to absorb heat from the water circulated through the tubes of the EVAL 34, thus lowering the temperature of the refrigerant and producing refrigerant vapors and cooling the water circulated therein up to a temperature of 0-35° C. The refrigerant vapors produced in the EVAL 34 are absorbed by the concentrated absorbent solution fed to the ABSL 32. The concentrated absorbent solution after absorbing the refrigerant vapors becomes dilute. The process of refrigerant absorption produces heat of dilution which is absorbed by the water circulated through the heat exchanger tubes of the ABSL 32. The water gains heat in the ABSL 32 is recycled to the EVAH 26 for losing the heat, thus completing the loop. The refrigerant stream leaving the EVAL 34 is recycled back to the EVAL 34 via the pumping means 21.

The refrigerant-absorbent solutions generated in the ABSL 32 and the ABSH 28 are mixed after exiting the shell 35 and the shell 25, respectively. The mixture of refrigerant-absorbent solution is fed through the pumping means 21 to the heat exchangers. The refrigerant-absorbent solution stream from the ABSL 32 and the ABSH 28 is bifurcated wherein the first stream enters the LTHE1 30 and the second stream enters the FHE 24. In the LTHE1 30 the refrigerant-absorbent solution extracts heat from the cooled concentrated absorbent fed therein from the LTHE2 29. From the LTHE1 30 the refrigerant-absorbent solution is fed to the LTHE2 29 wherein the refrigerant-absorbent solution further extracts heat from the concentrated absorbent fed to the LTHE2 29 from the HTHE 12. The step helps in reducing the temperature of the concentrated absorbent from the HTHE 12 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26. After passing through the FHE 24 the refrigerant-absorbent solution is fed to the DHE 20. In the DHE 20 the refrigerant-absorbent solution extracts heat from the refrigerant condensate received therein from the LTG 18, wherein the temperature of the refrigerant-absorbent solution increases and the refrigerant condensate is suitably cooled before feeding to the COND 22.

The heated refrigerant-absorbent solution leaving the LTHE2 29 and DHE 20 is mixed and fed to the LTG 18. In the LTG 18 the refrigerant-absorbent solution takes heat from the refrigerant vapors leaving the GEN 14 to produce the moderately concentrated absorbent solution, thus completing the process cycle. The apparatus as disclosed in the FIG. 3 is provided with programmable logic controls (PLC) (not shown in the figure) to provide an automated control over the process cycle.

Figure 4:
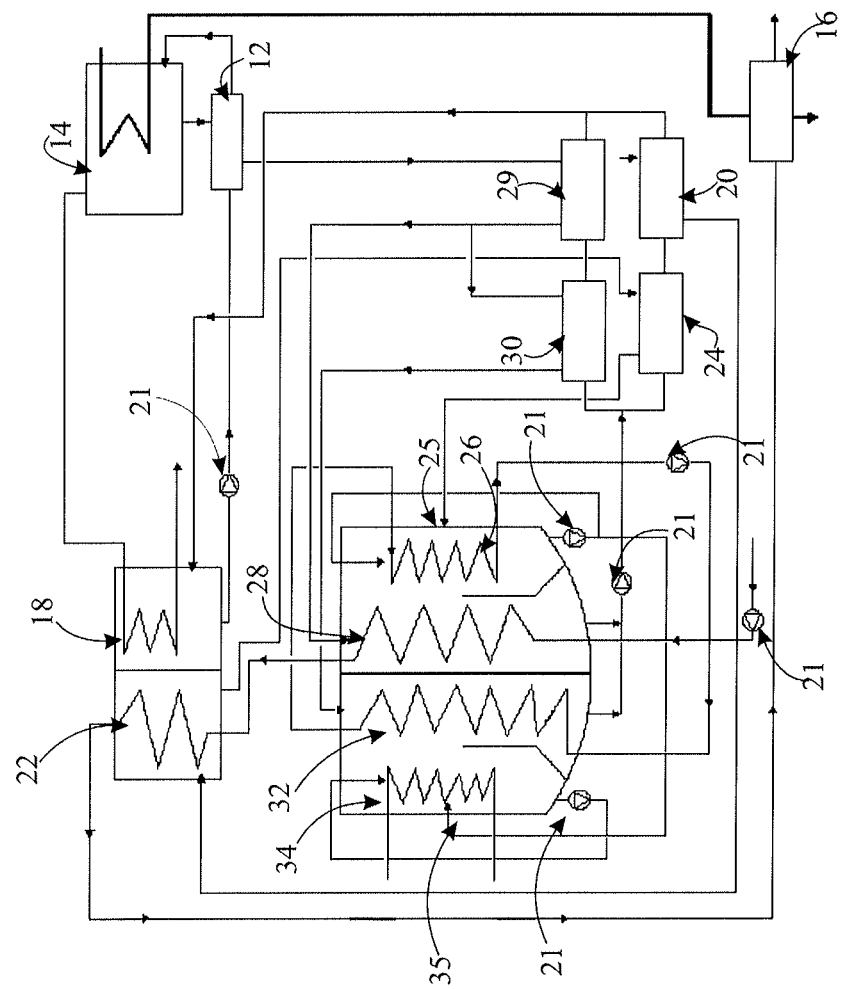
FIG. 4 illustrates still one more alternative schematic diagram of the apparatus for providing heating and refrigeration using a double-effect vapor absorption cycle.

In accordance with yet another embodiment of the present invention, FIG. 4 illustrates still one more alternative schematic diagram of the apparatus for providing both heating and refrigeration using a double-effect vapor absorption cycle, under conditions of high temperature heat input, wherein the refrigerant-absorbent mixture, typically Li—Br and water, first enters the low temperature generator and the hot water first enters the high pressure absorber and then flows into the condenser. The embodiment as disclosed in FIG. 4 operates in a similar manner as aforementioned in the FIG. 3. However, in the embodiment as disclosed in FIG. 4, the hot water with temperature in the range of 45-90° C. is first pumped through the pumping means 21 to the heat exchanger tubes of the ABSH 28 where in the ABSH 28 the hot water absorbs the heat of dilution produced during the refrigerant vapor absorption process in the shell 25. The hot water exiting the ABSH 28 is then fed to the COND 22 wherein the hot water having temperature lower than the condensed refrigerant received in the COND 22 from the DHE 20 is used to further condense the condensed refrigerant received therein, thus generating a further condensed refrigerant and further heated water having temperature in the range of 50-98° C. which is used for the heating applications. The heated water from the COND 22 is fed to the HR 16. In the HR 16, the hot water further extracts heat from the heat input fed in the GEN 14, producing further heated water which is used for subsequent applications.

Figure 5:
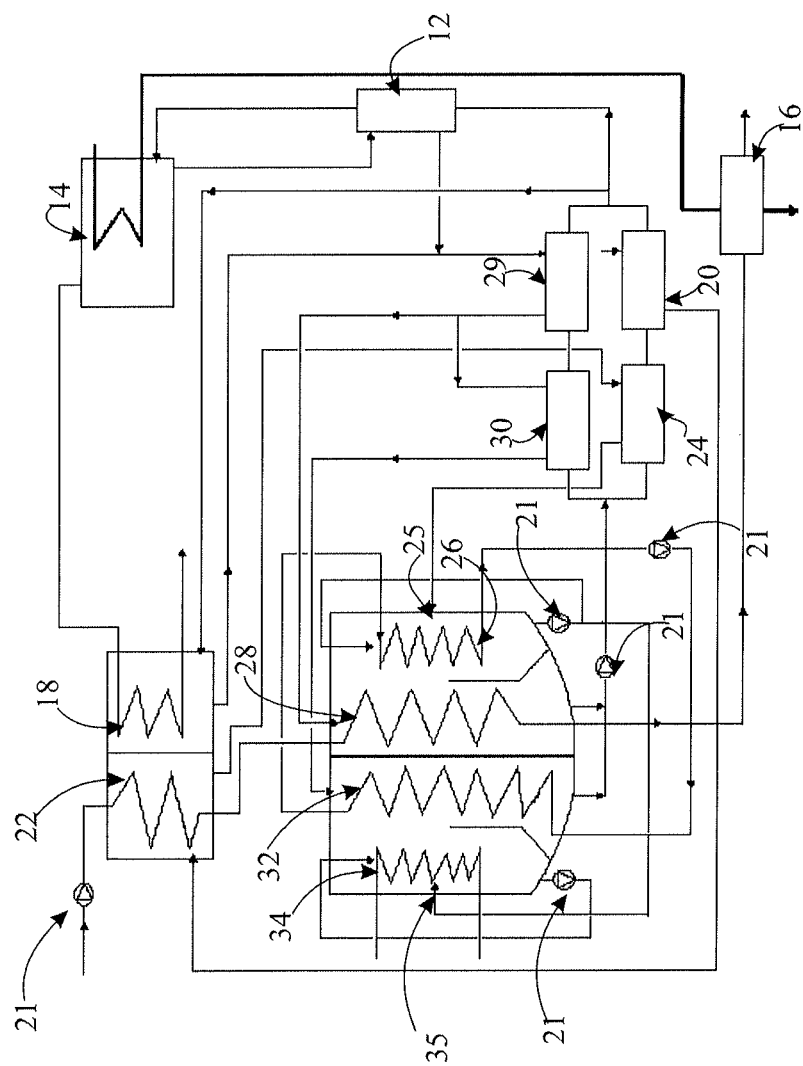
FIG. 5 illustrates yet one more alternative schematic diagram of the apparatus for providing heating and refrigeration using a double-effect vapor absorption cycle.

In accordance with one more embodiment of the present invention, FIG. 5 illustrates yet one more alternative schematic diagram of the apparatus for providing both heating and refrigeration using a double-effect vapor absorption cycle, wherein the refrigerant-absorbent mixture, typically Li—Br and water, leaving the low temperature heat exchanger and the drain heat exchanger bifurcates and a portion enters the low temperature generator and another portion enters the vapor generator. The embodiment as disclosed in FIG. 5, comprises feeding a refrigerant-absorbent solution from the HTHE 12 to the GEN 14. The GEN 14 is provided with a high temperature heat input having temperature in the range of 130-220° C., which boils the refrigerant-absorbent solution entering the GEN 14 to generate a concentrated absorbent solution and refrigerant vapors. The GEN 14 provided in the double-effect vapor absorption cycle is typically a high temperature generator. The high temperature heat input used in the GEN 14 typically consists of steam, superheated water, by combustion of fuel or exhaust gas. After extracting heat from the heat input in the GEN 14, the left over heat is reclaimed in the HR 16, which is provided to reclaim optimum quantity of heat input in the double-effect vapor absorption cycle and utilize it to enhance the heating thus provided.

The concentrated absorbent solution from the GEN 14 is received in the HTHE 12 wherein heat from the concentrated absorbent leaving the GEN 14 is extracted to produce a heat extracted concentrated absorbent. The heat extracted concentrated absorbent from the HTHE 12 is fed to the LTHE2 29 for further extracting the heat and thus obtaining a cooled concentrated absorbent. The refrigerant vapors generated in the GEN 14 are fed to the LTG 18 where in the LTG 18 the vapors are used as a heat source to concentrate a refrigerant-absorbent solution received therein, thus providing a concentrated absorbent solution which is fed to the LTHE2 29 from the LTG 18 and a mixture of refrigerant condensate which is fed to the DHE 20 for further extraction of heat and refrigerant vapors which are fed to the COND 22. The concentrated absorbent solution, thus obtained in the LTG 18 and the GEN 14 is the most concentrated absorbent solution achieved using the present process cycle. The concentrated absorbent solution from the LTG 18 and the GEN 14 is sent to the LTHE2 29, where the heat gained by the concentrated absorbent solution in the LTG 18 and the GEN 14 is extracted and a cooled concentrated absorbent is achieved. The cooled concentrated absorbent solution stream leaving the LTHE2 29 is bifurcated into two streams, wherein the first stream is sent to the LTHE1 30 for further cooling to generate a further cooled concentrated absorbent and the second stream is fed to the ABSH 28.

The refrigerant condensate after passing through the DHE 20 and the refrigerant vapors from the LTG 18 are sent to the COND 22, where it is further condensed. The step of primary condensing the refrigerant vapors before passing through the COND 22 helps in reducing the condenser duty. Hot water, having temperature in the range of 45-90° C., is pumped by pumping means 21 to the COND 22, through the heat exchanger tubes of the COND 22. The condensed refrigerant leaving the COND 22 is passed through the FHE 24. In the FHE 24, the condensed refrigerant is further cooled before feeding it to the EVAH 26; this minimizes the refrigerant flash losses in the EVAH 26 that can be caused due to the high temperature of the condensed refrigerant, thus, improving the efficiency of the apparatus.

In FIG. 5, numeral 25 represents a shell comprising the ABSH 28 and the EVAH 26. By maintaining a high-pressure in the ABSH 28 and the EVAH 26 in the shell 25, the condensed refrigerant is vaporized. The EVAH 26 is provided with water through the evaporator heat exchanger tubes. During the cycle, the water exchanges heat with the condensed refrigerant in the EVAH 26. The condensed refrigerant fed to the EVAH 26 absorbs heat from the water circulating through the evaporator tubes and forms refrigerant vapors. The refrigerant vapors thus released in the EVAH 26 are absorbed by the concentrated absorbent solution fed to the ABSH 28. After absorbing the refrigerant vapors, the concentrated absorbent solution in the ABSH 28 becomes dilute or weak and exits the ABSH 28 as the refrigerant-absorbent solution. Heat is liberated during the refrigerant vapor absorption process, referred to as the heat of dilution.

The hot water from the COND 22 is fed to the ABSH 28 through the heat exchanger tubes of the absorber, wherein the hot water gains the heat of dilution produced during the refrigerant vapor absorption process. The hot water leaving the ABSH 28 has a temperature in the range of 50-98° C. and is used for the heating applications. The hot water exiting the ABSH 28 is fed to the HR 16. In the HR 16, the hot water further extracts heat from the heat input fed to the GEN 14, producing further heated water, which is used for subsequent applications.

In FIG. 5, numeral 35 represents a shell comprising the ABSL 32 and the EVAL 34. The concentrated absorbent solution after losing heat in the LTHE1 30 is fed to the ABSL 32. The water from the EVAH 26 is circulated to the ABSL 32 by the pumping means 21. The EVAL 34 is fed with water having temperature in the range of 5-40° C. through the heat exchanger tubes. The condensed refrigerant from the FHE 24 after passing through the EVAH 26 is divided into two streams: the first stream is sent to the EVAL 34 via the pumping means 21 and the second stream is recycled back to the EVAH 26 via the pumping means 21. By maintaining a low-pressure in the ABSL 32 and the EVAL 34 in the shell 35, the condensed refrigerant vaporizes at a low temperature. The vaporizing causes the refrigerant to absorb heat from the water circulated through the tubes of the EVAL 34, thus lowering the temperature of the refrigerant and producing refrigerant vapors and cooling the water circulated therein up to a temperature of 0-35° C. The refrigerant vapors produced in the EVAL 34 are absorbed by the concentrated absorbent solution fed to the ABSL 32. The concentrated absorbent solution after absorbing the refrigerant vapors becomes dilute. The process of refrigerant absorption produces heat of dilution which is absorbed by the water circulated through the heat exchanger tubes of the ABSL 32. The water gains heat in the ABSL 32 is recycled to the EVAH 26 for losing the heat, thus completing the loop. The refrigerant stream leaving the EVAL 34 is recycled back to the EVAL 34 via the pumping means 21.

The refrigerant-absorbent solutions generated in the ABSL 32 and the ABSH 28 are mixed after exiting the shell 35 and the shell 25, respectively. The mixture of refrigerant-absorbent solution is fed through the pumping means 21 to the heat exchangers. The refrigerant-absorbent solution stream from the ABSL 32 and the ABSH 28 is bifurcated wherein the first stream enters the LTHE1 30 and the second stream enters the FHE 24. In the LTHE1 30 the refrigerant-absorbent solution extracts heat from the cooled concentrated absorbent solution fed therein from the LTHE2 29. From the LTHE1 30 the refrigerant-absorbent solution is fed to the LTHE2 29 wherein the refrigerant-absorbent solution further extracts heat from the concentrated absorbent solution fed to the LTHE2 29 from the LTG 18 and the HTHE 12. The step helps in reducing the temperature of the concentrated absorbent solution from the LTG 18 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26. After passing through the FHE 24 the refrigerant-absorbent solution is fed to the DHE 20. In the DHE 20 the refrigerant-absorbent solution extracts heat from the refrigerant condensate received therein from the LTG 18, wherein the temperature of the refrigerant-absorbent solution increases and the refrigerant condensate is suitably cooled before feeding to the COND 22.

The heated refrigerant-absorbent solution leaving the LTHE2 29 and the DHE 20 are mixed. The mixed heated refrigerant-absorbent solution is then bifurcated wherein the first stream enters the LTG 18 and the second stream enters the GEN 14 via the HTHE 12. The refrigerant-absorbent solution entering the LTG 18 and the GEN 14 is concentrated by using a heat source, thus generating the concentrated absorbent; completing the process cycle in accordance to the present embodiment. The apparatus as disclosed in the FIG. 5 is provided with programmable logic controls (PLC) (not shown in the figure) to provide an automated control over the process cycle.

Figure 6:
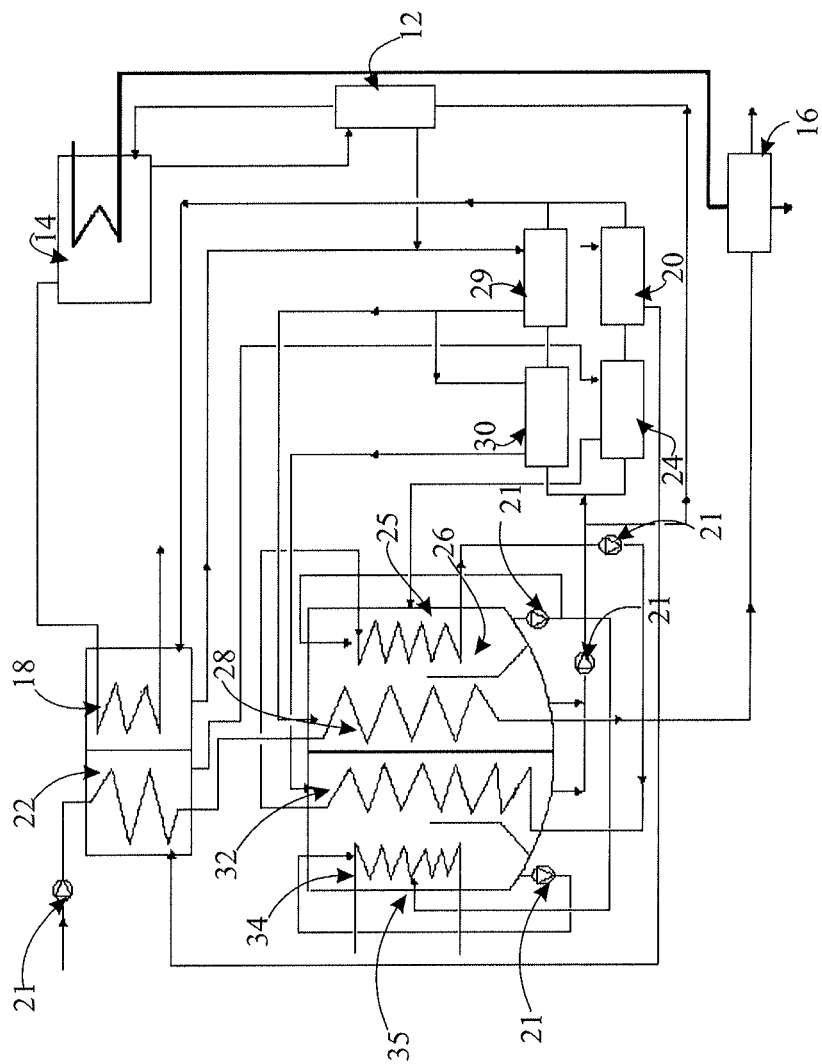
FIG. 6 illustrates still another alternative schematic diagram of the apparatus for providing heating and refrigeration using a double-effect vapor absorption cycle.

In accordance with still one more embodiment of the present invention, FIG. 6 illustrates yet another alternative schematic diagram of the apparatus for providing both heating and refrigeration using a double-effect vapor absorption cycle, under conditions of high temperature heat input, wherein the refrigerant-absorbent mixture, typically Li—Br and water, leaving the absorbers bifurcates, a portion enters the low temperature generator and another portion enters the vapor generator. The embodiment as disclosed in FIG. 6 operates in a similar manner as aforementioned in the FIG. 5. However, in the embodiment as disclosed in FIG. 6 the refrigerant-absorbent solutions generated in the ABSL 32 and the ABSH 28 are mixed after exiting the shell 35 and the shell 25, respectively. The mixed refrigerant-absorbent solution is then bifurcated. The first stream of the refrigerant-absorbent solution is fed through the pumping means 21 to the heat exchangers 20, 24, 29 and 30. The first stream of the refrigerant-absorbent solution is further bifurcated wherein the first stream enters the LTHE1 30 and the second stream enters the FHE 24. In the LTHE1 30 the refrigerant-absorbent solution extracts heat from the cooled concentrated absorbent solution fed therein from the LTHE2 29. From the LTHE1 30 the refrigerant-absorbent solution is fed to the LTHE2 29 wherein the refrigerant-absorbent solution further extracts heat from the concentrated absorbent solution fed to the LTHE2 29 from the LTG 18 and the HTHE 12. The step helps in reducing the temperature of the concentrated absorbent solution from the LTG 18 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26. After passing through the FHE 24 the refrigerant-absorbent solution is fed to the DHE 20. In the DHE 20 the refrigerant-absorbent solution extracts heat from the refrigerant condensate received therein from the LTG 18, wherein the temperature of the refrigerant-absorbent solution increases and the refrigerant condensate is suitably cooled before feeding to the COND 22. The heated refrigerant-absorbent solution leaving the LTHE2 29 and the DHE 20 is sent to the LTG 18 where the refrigerant-absorbent solution absorbs heat from the refrigerant vapors circulated therein to generate the concentrated absorbent which is recycled to the LTHE2 29.

The second stream of the refrigerant-absorbent solution is fed to the HTHE 12, where the refrigerant-absorbent solution extracts heat from the concentrated absorbent circulated therein from the GEN 14 to generate a heated refrigerant-absorbent solution which is fed to the GEN 14 to obtain the concentrated absorbent and a heat extracted concentrated absorbent which is fed to the LTHE2 29 for cooling; completing the process cycle in accordance to the present embodiment. The apparatus as disclosed in the FIG. 6 is provided with programmable logic controls (PLC) (not shown in the figure) to provide an automated control over the process cycle.

Figure 7:
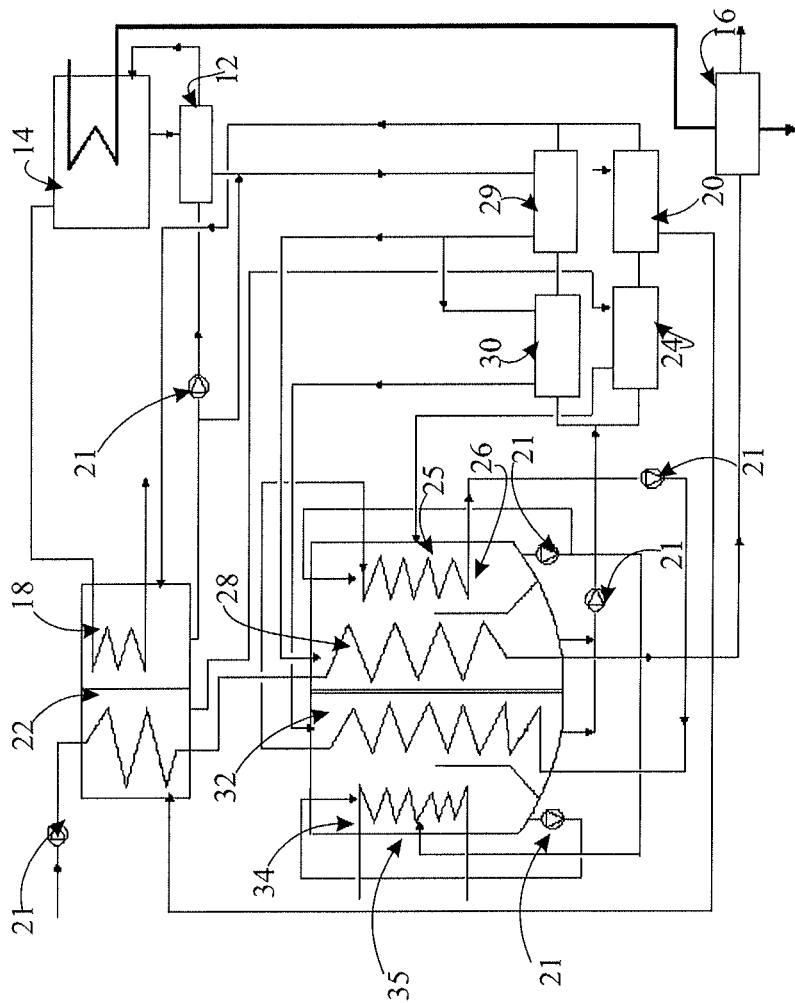
FIG. 7 illustrates yet another alternative schematic diagram of the apparatus for providing heating and refrigeration using a double-effect vapor absorption cycle.

In accordance with still one more embodiment of the present invention, FIG. 7 illustrates still another alternative schematic diagram of the apparatus for providing both heating and refrigeration using a double-effect vapor absorption cycle, under conditions of high temperature heat input, wherein the refrigerant-absorbent mixture, typically Li—Br and water, first enters the low temperature generator and then bifurcates, a portion enters the vapor generator and another portion flows into the absorbers. The embodiment as disclosed in FIG. 7, comprises feeding a refrigerant-absorbent solution to the LTG 18, wherein in the LTG 18 refrigerant vapors are used to provide a heat source to the refrigerant-absorbent solution received therein, such that a moderately concentrated refrigerant-absorbent solution and refrigerant condensate and vapors are generated in the LTG 18 wherein the refrigerant condensate and vapors are sent to the DHE 20 for further extraction of heat.

The moderately concentrated solution from the LTG 18 is bifurcated and a first portion is received in the HTHE 12 where the moderately concentrated solution gains heat to produce a heated moderately concentrated absorbent solution. The heated moderately concentrated absorbent solution from the HTHE 12 is sent to the GEN 14 where using a high temperature heat input having temperature in the range of 130-220° C. the moderately concentrated absorbent solution is boiled to form a concentrated absorbent and refrigerant vapors. The GEN 14 provided in the double-effect vapor absorption cycle is typically a high temperature generator. The high temperature heat input used in the GEN 14 typically consists of steam, superheated water, by combustion of fuel or exhaust gas. After extracting heat from the heat input in the GEN 14, the left over heat is reclaimed in the HR 16, which is provided to reclaim optimum quantity of heat input in the double-effect vapor absorption cycle and utilize it to enhance the heating thus provided.

The refrigerant vapors from the GEN 14 are fed to the LTG 18 which are used to provide the heat source to the refrigerant-absorbent solution and produce the moderately concentrated absorbent. The concentrated absorbent from the GEN 14 is passed through the HTHE 12 where it exchanges heat with the moderately concentrated solution received therein, thus, heating the moderately concentrated solution and producing a heat extracted concentrated absorbent. The heat extracted concentrated absorbent from the HTHE 12 along with a second portion of the moderately concentrated solution from the LTG 18 is fed to the LTHE2 29, where the heat from the concentrated absorbent is further extracted to generate a cooled concentrated absorbent. The cooled concentrated absorbent leaving the LTHE2 29 is bifurcated, wherein the first stream is sent to the LTHE1 30 for further extraction of heat to generate a further cooled concentrated absorbent and the second stream of the cooled concentrated absorbent is fed to the ABSH 28.

The refrigerant condensate after passing through the DHE 20 is sent to the COND 22, where it is further condensed. The step of primary condensing the refrigerant vapors before passing through the COND 22 helps in reducing the condenser duty. Hot water, having temperature in the range of 45-90° C., is pumped by pumping means 21 to the COND 22, through the heat exchanger tubes of the COND 22. The condensed refrigerant leaving the COND 22 is passed through the FHE 24. In the FHE 24, the condensed refrigerant is further cooled before feeding it to the EVAH 26; this minimizes the refrigerant flash losses in the EVAH 26 that can be caused due to the high temperature of the condensed refrigerant, thus, improving the efficiency of the apparatus.

In FIG. 7, numeral 25 represents a shell comprising the ABSH 28 and the EVAH 26. By maintaining a high-pressure in the ABSH 28 and the EVAH 26 in the shell 25, the condensed refrigerant is vaporized. The EVAH 26 is provided with water through the evaporator heat exchanger tubes. During the cycle, the water exchanges heat with the condensed refrigerant in the EVAH 26. The condensed refrigerant fed to the EVAH 26 absorbs heat from the water circulating through the evaporator tubes and forms refrigerant vapors. The refrigerant vapors thus released in the EVAH 26 are absorbed by the concentrated absorbent solution fed to the ABSH 28. After absorbing the refrigerant vapors, the concentrated absorbent solution in the ABSH 28 becomes dilute or weak and exits the ABSH 28 as the refrigerant-absorbent solution. Heat is liberated during the refrigerant vapor absorption process, referred to as the heat of dilution.

The hot water from the COND 22 is fed to the ABSH 28 through the heat exchanger tubes of the absorber, wherein the hot water gains the heat of dilution produced during the refrigerant vapor absorption process. The hot water leaving the ABSH 28 has a temperature in the range of 50-98° C. and is used for the heating applications. The hot water exiting the ABSH 28 is fed to the HR 16. In the HR 16, the hot water further extracts heat from the heat input fed to the GEN 14, producing further heated water, which is used for subsequent applications.

In FIG. 7, numeral 35 represents a shell comprising the ABSL 32 and the EVAL 34. The cooled concentrated absorbent after further losing heat in the LTHE1 30 forms a further cooled concentrated absorbent which is fed to the ABSL 32. The water from the EVAH 26 is circulated to the ABSL 32 by the pumping means 21. The EVAL 34 is fed with water having temperature in the range of 5-40° C. through the heat exchanger tubes. The condensed refrigerant from the FHE 24 after passing through the EVAH 26 is divided into two streams: the first stream is sent to the EVAL 34 via the pumping means 21 and the second stream is recycled back to the EVAH 26 via the pumping means 21. By maintaining a low-pressure in the ABSL 32 and the EVAL 34 in the shell 35, the condensed refrigerant vaporizes at a low temperature. The vaporizing causes the refrigerant to absorb heat from the water circulated through the tubes of the EVAL 34, thus lowering the temperature of the refrigerant and producing refrigerant vapors and cooling the water circulated therein up to a temperature of 0-35° C. The refrigerant vapors produced in the EVAL 34 are absorbed by the concentrated absorbent solution fed to the ABSL 32. The concentrated absorbent solution after absorbing the refrigerant vapors becomes dilute. The process of refrigerant absorption produces heat of dilution which is absorbed by the water circulated through the heat exchanger tubes of the ABSL 32. The water gains heat in the ABSL 32 is recycled to the EVAH 26 for losing the heat, thus completing the loop. The refrigerant stream leaving the EVAL 34 is recycled back to the EVAL 34 via the pumping means 21.

The refrigerant-absorbent solutions generated in the ABSL 32 and the ABSH 28 are mixed after exiting the shell 35 and the shell 25, respectively. The mixed refrigerant-absorbent solution is fed through the pumping means 21 to the heat exchangers. The refrigerant-absorbent solution stream from the ABSL 32 and the ABSH 28 is bifurcated wherein the first stream enters the LTHE1 30 and the second stream enters the FHE 24. In the LTHE1 30 the refrigerant-absorbent solution extracts heat from the cooled concentrated absorbent fed therein from the LTHE2 29. From the LTHE1 30 the refrigerant-absorbent solution is fed to the LTHE2 29 wherein the refrigerant-absorbent solution further extracts heat from the concentrated absorbent fed to the LTHE2 29 from the HTHE 12. The step helps in reducing the temperature of the concentrated absorbent from the HTHE 12 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26. After passing through the FHE 24 the refrigerant-absorbent solution is fed to the DHE 20. In the DHE 20 the refrigerant-absorbent solution extracts heat from the refrigerant condensate received therein from the LTG 18, wherein the temperature of the refrigerant-absorbent solution increases and the refrigerant condensate is suitably cooled before feeding to the COND 22.

The heated refrigerant-absorbent solution leaving the LTHE2 29 and DHE 20 is mixed and fed to the LTG 18. In the LTG 18 the refrigerant-absorbent solution takes heat from the refrigerant vapors leaving the GEN 14 to produce the moderately concentrated absorbent solution, thus completing the process cycle. The apparatus as disclosed in the FIG. 7 is provided with programmable logic controls (PLC) (not shown in the figure) to provide an automated control over the process cycle.

Figure 8:
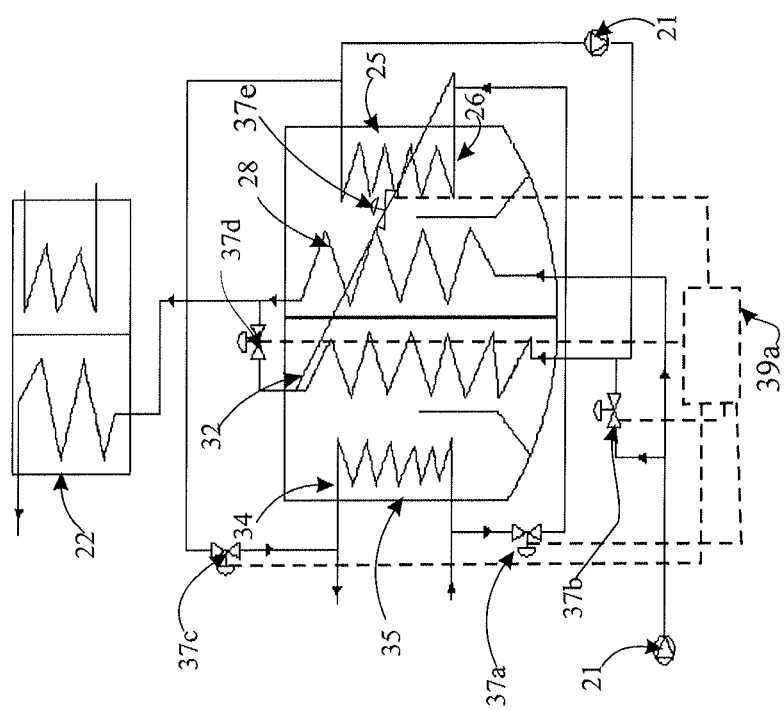
FIG. 8 illustrates a schematic diagram of the apparatus for providing only refrigeration, showing an inbuilt logic control for switching from heating and refrigeration to only refrigeration.

In accordance with yet one more embodiment of the present invention, FIG. 8 illustrates a schematic diagram of the apparatus for providing only refrigeration, showing an inbuilt logic control for switching from heating and refrigeration to only refrigeration, under the conditions of high temperature heat input. The embodiment as disclosed in FIG. 8 comprises the EVAH 26, the ABSH 28, the EVAL 34, the ABSL 32 and a plurality of valves represented by numerals 37*a*, 37 *b*, 37*c*, 37*d* and 37*e*. The EVAH 26 is located in co-operation with the ABSH 28 in the shell 25 and the EVAL 34 is located in cooperation with the ABSL 32 in the shell 35.

By opening the valves 37*c* and 37*a*, provided in conduits between the EVAH 26 and the EVAL 34, water having temperature in the range of 5-40° C. is allowed to flow in the EVAH 26 and the EVAL 34. The EVAH 26 and the EVAL 34 are adapted to receive condensed refrigerant to provide refrigerant vapors and water having temperature in the range of 0-35° C., to provide the refrigeration. By opening valves 37*d* and 37*b*, and closing valve 37*e* water having temperature in the range of 25-35° C. is allowed to flow in the ABSH 28 and the ABSL 32. The ABSH 28 and the ABSL 32 are adapted to receive a concentrated absorbent. The concentrated absorbent absorbs the refrigerant vapors released in the EVAH 26 and the EVAL 34, respectively, to provide a refrigerant-absorbent mixture. During the refrigerant absorption process, heat of dilution is released which is removed by the water circulated through the heat exchanger tubes of the ABSH 28 and the ABSL 32, thus, generating heated water which is sent to a condenser. The refrigerant-absorbent mixture is sent for further regeneration of concentrated absorbent and refrigerant vapors.

The plurality of valves 37*a*, 37 *b*, 37*c*, 37*d* and 37*e* are adapted to change the direction of flow of water through the EVAH 26, the EVAL 34, the ABSH 28 and the ABSL 32, to permit the conversion of both heating and refrigeration cycle to only refrigeration. Optionally, an automation means having a control logic (CL), represented by numeral 39*a* in FIG. 8, may be provided to switch the operation of the plurality of valves 37*a*, 37 *b*, 37*c*, 37*d* and 37*e* from both heating and refrigeration to only refrigeration, the process providing a high operating efficiency.

Figure 9:
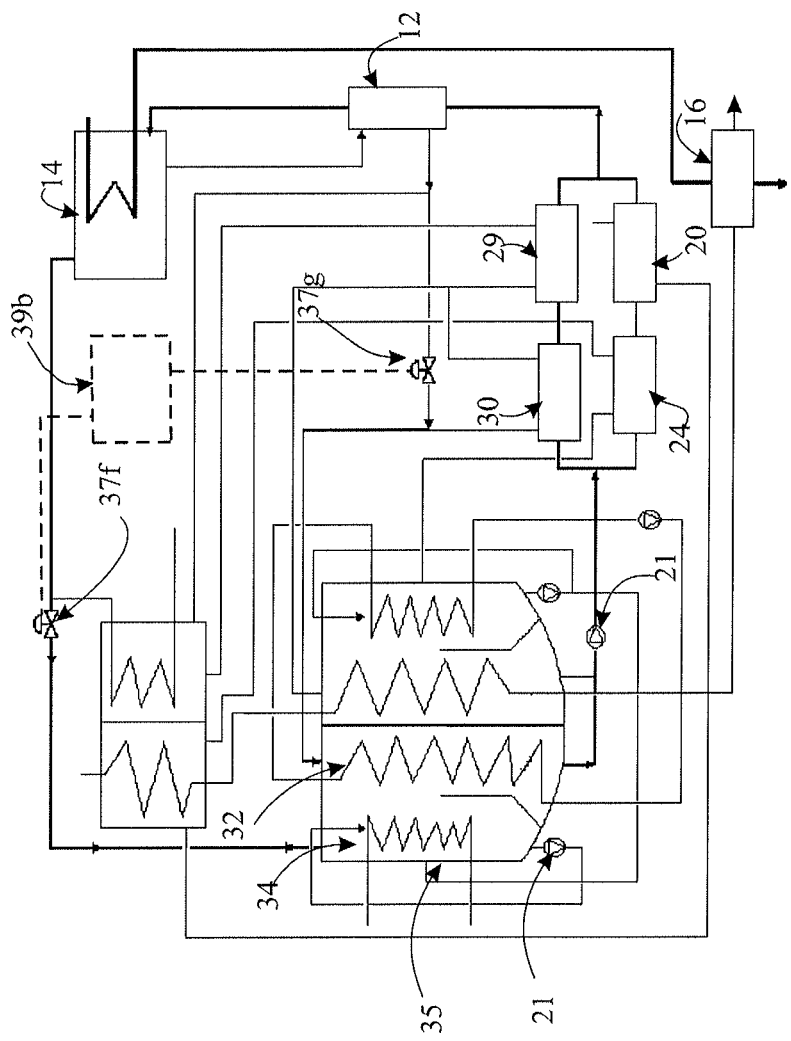
FIG. 9 illustrates a schematic diagram of the apparatus for providing only heating, showing an inbuilt logic control for switching from heating and refrigeration to only heating.

In accordance with still one more embodiment of the present invention, FIG. 9 illustrates a schematic diagram of the apparatus for providing only heating, showing an inbuilt logic control for switching from heating and refrigeration to only heating, under the conditions of high or low temperature heat inputs. The embodiment as disclosed in FIG. 9, comprises feeding a refrigerant-absorbent solution from the HTHE 12 to the GEN 14. The GEN 14 is provided with a high temperature heat input having temperature in the range of 90-220° C., which boils the refrigerant-absorbent solution entering the GEN 14 to generate a concentrated absorbent solution and refrigerant vapors. The GEN 14 is typically a high temperature generator. The high temperature heat input used in the GEN 14 typically consists of steam, superheated water, by combustion of fuel or exhaust gas. The concentrated absorbent solution from the GEN 14 is received in the HTHE 12 wherein heat from the concentrated absorbent leaving the GEN 14 is extracted by a refrigerant-absorbent mixture to produce a heat extracted concentrated absorbent and a heated refrigerant-absorbent mixture which is fed to the GEN 14. The heat extracted concentrated absorbent from the HTHE 12 is fed to the ABSL 32.

A plurality of valves represented in FIG. 9 by numerals 37*f* and 37*g* are provided in conduits between the GEN 14 and the EVAL 34, and the HTHE 12 and the ABSL 32, respectively. The refrigerant vapors released in the GEN 14 are fed to the EVAL 34 through the valve 37*f*, wherein the valve 37*f* is open when operating the only heating cycle. The ABSL 32 and the EVAL 34 are located in shell 35 in cooperation with each other. Hot water having temperature in the range of 45-90° C. is fed through the heat exchanger tubes of the EVAL 34. The hot water circulated in the EVAL 34 extracts heat from the refrigerant vapors thus further heating the water up to a temperature of 50-98° C., to be used for the heating applications. Further, the refrigerant vapors in the EVAL 34 are absorbed by the concentrated absorbent which is sprayed in the ABSL 32 from the HTHE 12 through valve 37g which is to be kept open during the only heating cycle.

During the refrigerant absorption process, the concentrated absorbent becomes dilute because of absorption of the refrigerant and forms the refrigerant-absorbent mixture which is fed to the GEN 14 and heat of dilution is released which is absorbed by the hot water circulated through the EVAL 34, thus heating the water even further. The refrigerant-absorbent mixture discharged from the ABSL 32 is then fed to the HTHE 12 to further extract heat from the concentrated absorbent received in the HTHE 12 from the GEN 14 before entering the GEN 14 for concentration, thus completing the process cycle, in accordance to the present embodiment. The process as described in FIG. 9 is typically used to provide only heating. The plurality of valves 37f and 37g provided help in switching from both heating and refrigeration cycle to only heating, by manipulating the direction of flow of the refrigerant vapors and the concentrated absorbent. Optionally, an automation means comprising a control logic (CL), represented by numeral 39b in FIG. 9, may be provided to switch the operation of the plurality of valves 37f and 37g from both heating and refrigeration to only heating, the process providing a high operating efficiency.

Figure 10:
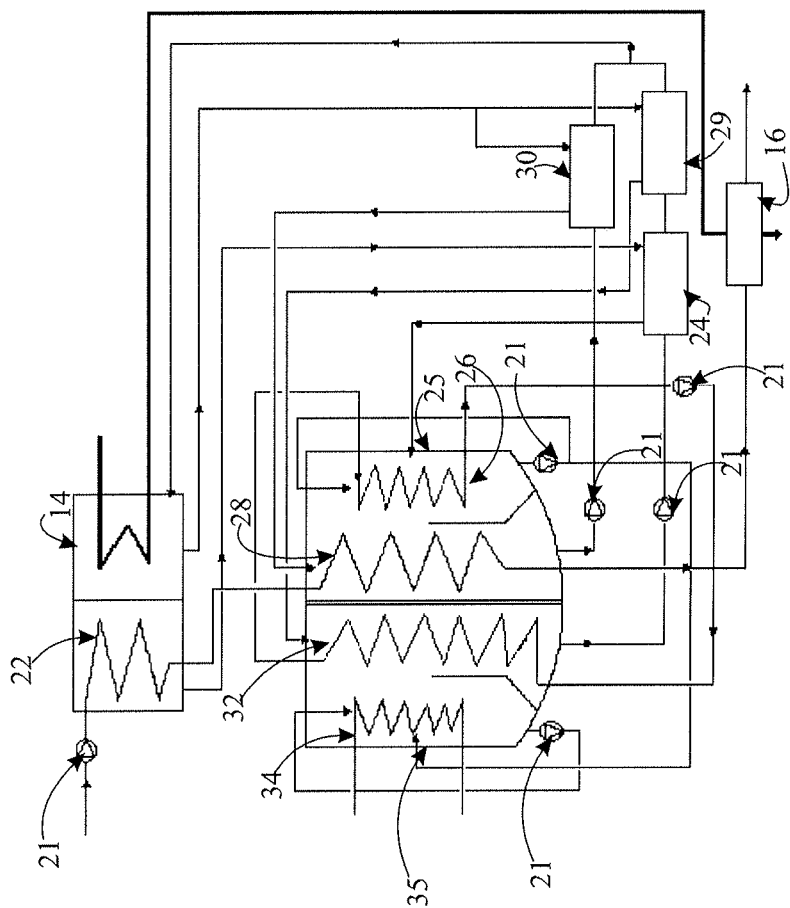
FIG. 10 illustrates a schematic diagram of an apparatus for providing heating and refrigeration using a single-effect vapor absorption cycle.

In accordance with an additional embodiment of the present invention, FIG. 10 illustrates a schematic diagram of an apparatus for providing both heating and refrigeration using a single-effect vapor absorption cycle, wherein the streams of the refrigerant-absorbent mixture, typically Li—Br and water, leaving the absorbers (high pressure and low pressure) are pumped to the vapor generator 14 by two absorbent pumps and the hot water first enters the condenser 22 and then flows into the high pressure absorber 28. The embodiment as disclosed in FIG. 10, comprises feeding a refrigerant-absorbent solution to the GEN 14. The GEN 14 is provided with a low temperature heat input having temperature in the range of 90-170° C., which boils the refrigerant-absorbent solution entering the GEN 14 to generate a concentrated absorbent solution and subsequently produce refrigerant vapors which are released. The low temperature heat input used in the GEN 14 typically consists of steam, superheated water, by combustion of fuel or exhaust gas. After extracting heat from the heat input in the GEN 14, the left over heat is reclaimed in the HR 16, which is provided to reclaim optimum quantity of heat input in the single-effect vapor absorption cycle and utilize it to enhance the heating thus provided.

The concentrated absorbent solution from the GEN 14 is received in the LTHE1 30 and LTHE2 29 wherein heat from the concentrated absorbent leaving the GEN 14 is extracted to produce a cooled concentrated absorbent. The cooled concentrated absorbent from the LTHE1 30 and LTHE2 29 is fed to the absorbers. The concentrated absorbent solution, thus obtained in the GEN 14 is the most concentrated absorbent solution achieved using the present process cycle. The cooled concentrated absorbent solution stream leaving the LTHE1 30 and the LTHE2 29 is fed to the ABSH 28 and the ABSL 32, respectively.

The COND 22 is adapted to condense a refrigerant by using hot water to generate condensed refrigerant. Hot water, having temperature in the range of 45-90° C., is pumped by pumping means 21 to the COND 22, through the heat exchanger tubes of the COND 22 to produce the condensed refrigerant. The condensed refrigerant leaving the COND 22 is passed through the FHE 24. In the FHE 24, the condensed refrigerant is cooled before feeding it to the EVAH 26; this minimizes the refrigerant flash losses in the EVAH 26 that can be caused due to the high temperature of the condensed refrigerant, thus, improving the efficiency of the apparatus.

In FIG. 10, numeral 25 represents a shell comprising the ABSH 28 and the EVAH 26. By maintaining a high-pressure in the ABSH 28 and the EVAH 26 in the shell 25, the condensed refrigerant is vaporized. The EVAH 26 is provided with water through the evaporator heat exchanger tubes. During the cycle, the water exchanges heat with the condensed refrigerant in the EVAH 26. The condensed refrigerant fed to the EVAH 26 absorbs heat from the water circulating through the evaporator tubes and forms refrigerant vapors. The refrigerant vapors thus released in the EVAH 26 are absorbed by the concentrated absorbent solution fed to the ABSH 28 from the LTHE1 30. After absorbing the refrigerant vapors, the concentrated absorbent solution in the ABSH 28 becomes dilute or weak and exits the ABSH 28 as the refrigerant-absorbent solution. Heat is liberated during the refrigerant vapor absorption process, referred to as the heat of dilution which is absorbed by the water circulated therein.

The hot water from the COND 22 is fed to the ABSH 28 through the heat exchanger tubes of the absorber, wherein the hot water gains the heat of dilution produced during the refrigerant vapor absorption process. The hot water leaving the ABSH 28 has a temperature in the range of 50-98° C. and is used for the heating applications. The hot water exiting the ABSH 28 is fed to the HR 16. In the HR 16, the hot water further extracts heat from the heat input fed to the GEN 14, producing further heated water, which is used for subsequent applications.

In FIG. 10, numeral 35 represents a shell comprising the ABSL 32 and the EVAL 34. The concentrated absorbent solution after losing heat in the LTHE2 29 is fed to the ABSL 32. The water from the EVAH 26 is circulated to the ABSL 32 by the pumping means 21. The EVAL 34 is fed with water having temperature in the range of 5-40° C. through the heat exchanger tubes. The condensed refrigerant from the FHE 24 after passing through the EVAH 26 is divided into two streams: the first stream is sent to the EVAL 34 via the pumping means 21 and the second stream is recycled back to the EVAH 26 via the pumping means 21. By maintaining a low-pressure in the ABSL 32 and the EVAL 34 in the shell 35, the condensed refrigerant vaporizes at a low temperature. The vaporizing causes the refrigerant to absorb heat from the water circulated through the tubes of the EVAL 34, thus lowering the temperature of the refrigerant and producing refrigerant vapors and cooling the water circulated therein up to a temperature of 0-35° C. The refrigerant vapors produced in the EVAL 34 are absorbed by the concentrated absorbent solution fed to the ABSL 32. The concentrated absorbent solution after absorbing the refrigerant vapors becomes dilute. The process of refrigerant absorption produces heat of dilution which is absorbed by the water circulated through the heat exchanger tubes of the ABSL 32. The water gains heat in the ABSL 32 is recycled to the EVAH 26 for losing the heat, thus completing the loop. The refrigerant stream leaving the EVAL 34 is recycled back to the EVAL 34 via the pumping means 21.

The refrigerant-absorbent solution generated in the ABSL 32 is fed through the pumping means 21 to the FHE 24 where the refrigerant-absorbent solution extracts heat from the condensed refrigerant circulated therein to generate a heated refrigerant-absorbent solution. The refrigerant-absorbent solution generated in the ABSH 28 is fed through the pumping means 21 to the LTHE 30 where the refrigerant-absorbent solution extracts heat from the concentrated absorbent circulated therein to generate a heated refrigerant-absorbent solution. The heated refrigerant-absorbent solution from the FHE 24 is fed to the LTHE2 29 wherein the heated refrigerant-absorbent solution is further heated by extracting heat from the concentrated absorbent circulated therein.

The heated and further heated refrigerant-absorbent solutions leaving the LTHE1 30 and the FHE 24 and LTHE2 29 respectively, are mixed. The mixed heated refrigerant-absorbent solution is then fed to the GEN 14. The refrigerant-absorbent solution entering the GEN 14 is concentrated by using a heat source, thus generating the concentrated absorbent; completing the process cycle in accordance to the present embodiment. The apparatus as disclosed in the FIG. 10 is provided with programmable logic controls (PLC) (not shown in the figure) to provide an automated control over the process cycle.

Figure 11:
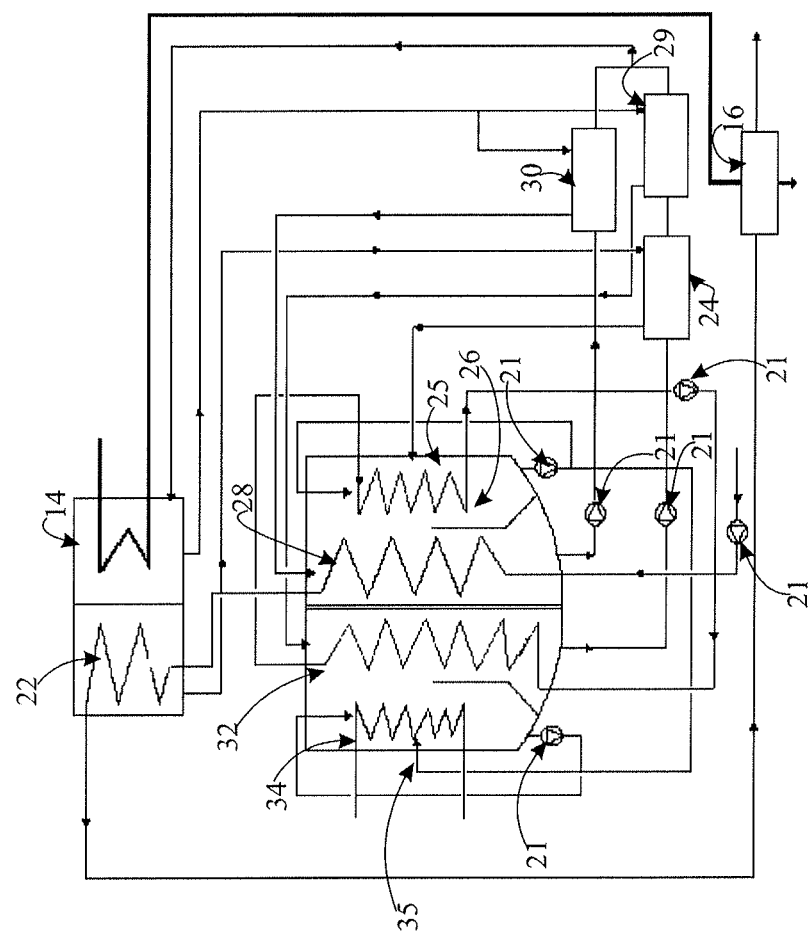
FIG. 11 illustrates an alternative schematic diagram of the apparatus for providing heating and refrigeration using a single-effect vapor absorption cycle.

In accordance with an still additional embodiment of the present invention, FIG. 11 illustrates an alternative schematic diagram of the apparatus for providing both heating and refrigeration using a single-effect vapor absorption cycle, wherein the streams of the refrigerant-absorbent mixture, typically Li—Br and water, leaving the absorbers (high pressure and low pressure) are pumped to the vapor generator 14 by two absorbent pumps and the hot water first enters the high pressure absorber 28 and then flows into the condenser 22. The embodiment as disclosed in FIG. 11, operates in a similar manner as aforementioned in the FIG. 10. However, in the embodiment as disclosed in FIG. 11, the hot water with temperature in the range of 45-90° C. is first pumped through the pumping means 21 to the heat exchanger tubes of the ABSH 28 where in the ABSH 28 the hot water absorbs the heat of dilution produced during the refrigerant vapor absorption process in the shell 25. The hot water exiting the ABSH 28 is then fed to the COND 22 wherein the hot water having temperature lower than the refrigerant received in the COND 22 is used to condense the refrigerant received therein, thus generating condensed refrigerant and further heated water having temperature in the range of 50-98° C. which is used for the heating applications. The heated water from the COND 22 is fed to the HR 16. In the HR 16, the hot water further extracts heat from the heat input fed in the GEN 14, producing further heated water which is used for subsequent applications.

Figure 12:
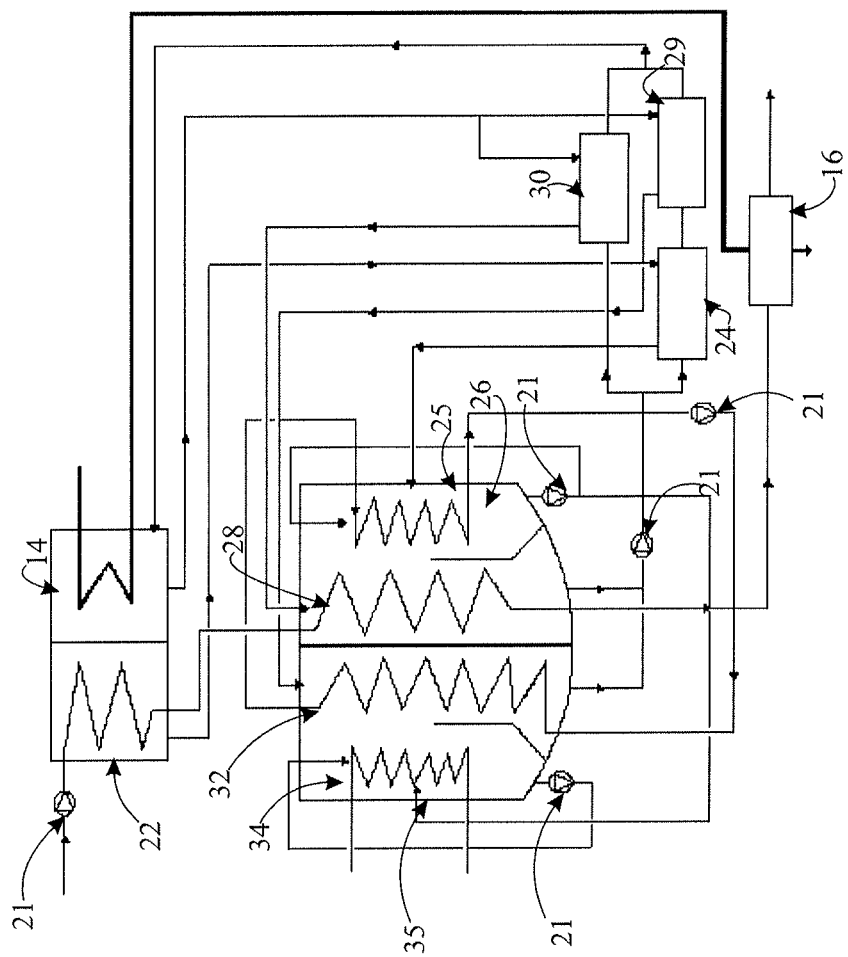
FIG. 12 illustrates one more alternative schematic diagram of the apparatus for providing heating and refrigeration using a single-effect vapor absorption cycle.

In accordance with yet another embodiment of the present invention, FIG. 12 illustrates one more alternative schematic diagram of the apparatus for providing both heating and refrigeration using a single-effect vapor absorption cycle, wherein the streams of the refrigerant-absorbent mixture, typically Li—Br and water, leaving the absorbers (High pressure and low pressure) are mixed and pumped to the vapor generator 14 and the hot water first enters the condenser 22 and then flows into the high pressure absorber 28. The embodiment as disclosed in FIG. 12, operates in a similar manner as aforementioned in the FIG. 10. However, in the embodiment as disclosed in FIG. 12, the refrigerant-absorbent solution generated in the ABSH 28 and the ABSL 32 is mixed after exiting the shell 25 and the shell 35, respectively. The mixed refrigerant-absorbent solution is fed through the pumping means 21 to the heat exchangers 30, 29 and 24. The refrigerant-absorbent solution stream from the ABSL 32 and the ABSH 28 is bifurcated wherein the first stream enters the LTHE1 30 and the second stream enters the FHE 24. In the LTHE1 30 the refrigerant-absorbent solution extracts heat from the concentrated absorbent fed therein from the GEN 14 producing a heated refrigerant-absorbent solution. The step helps in reducing the temperature of the concentrated absorbent from the GEN 14 before feeding it to the absorbers ABSH 28 and ABSL 32. In the FHE 24, the refrigerant-absorbent solution absorbs heat from the condensed refrigerant fed to the FHE 24 from the COND 22, this helps in reducing the temperature of the condensed refrigerant before it is fed to the EVAH 26 and producing a heated refrigerant-absorbent solution. The heated refrigerant-absorbent solution from the FHE 24 is fed to the LTHE2 29 wherein the heated refrigerant-absorbent solution is further heated by extracting heat from the concentrated absorbent circulated therein.

The heated and further heated refrigerant-absorbent solutions leaving the LTHE1 30 and the FHE 24 and LTHE2 29 respectively, are mixed. The mixed heated refrigerant-absorbent solution is then fed to the GEN 14. The refrigerant-absorbent solution entering the GEN 14 is concentrated by using a heat source, thus generating the concentrated absorbent; completing the process cycle in accordance to the present embodiment. The apparatus as disclosed in the FIG. 12 is provided with programmable logic controls (PLC) (not shown in the figure) to provide an automated control over the process cycle.

Figure 13:
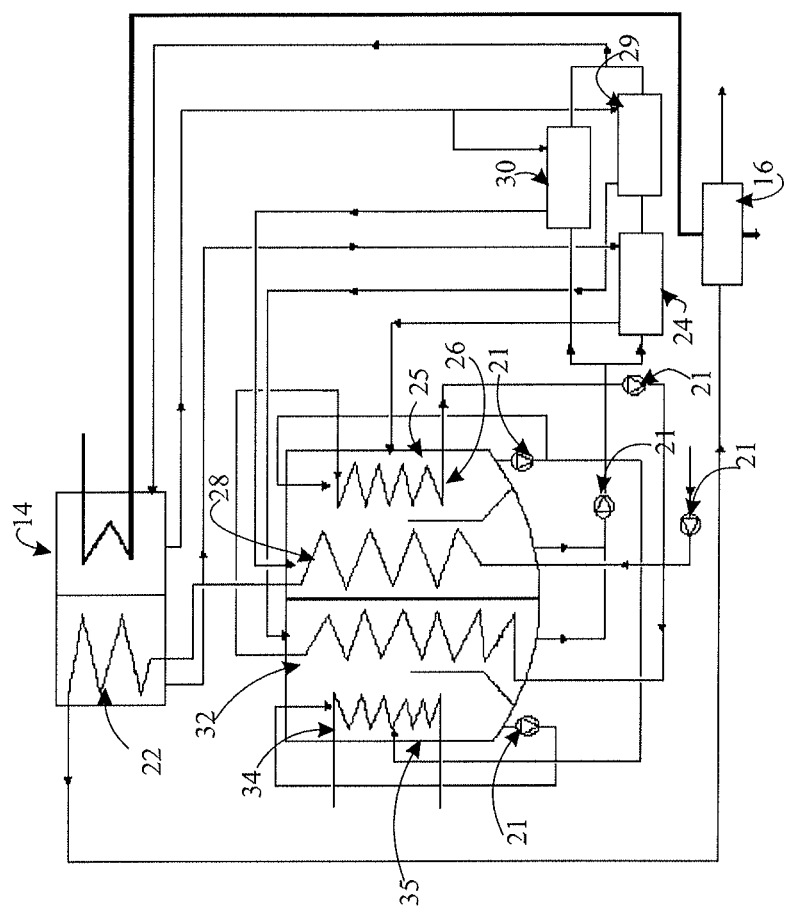
FIG. 13 illustrates still one more alternative schematic diagram of the apparatus for providing heating and refrigeration using a single-effect vapor absorption cycle.

In accordance with yet another embodiment of the present invention, FIG. 13 illustrates still one more alternative schematic diagram of the apparatus for providing both heating and refrigeration using a single-effect vapor absorption cycle, wherein the streams of the refrigerant-absorbent mixture, typically Li—Br and water, leaving the absorbers (high pressure and low pressure) are mixed and pumped to the vapor generator 14 and the hot water first enters the high pressure absorber 28 and then flows into the condenser 22. The embodiment as disclosed in FIG. 13 operates in a similar manner as aforementioned in the FIG. 12. However, in the embodiment as disclosed in FIG. 13, the hot water with temperature in the range of 45-90° C. is first pumped through the pumping means 21 through the heat exchanger tubes of the ABSH 28 where in the ABSH 28 the hot water absorbs the heat of dilution produced during the refrigerant vapor absorption process in the shell 25. The hot water exiting the ABSH 28 is then fed to the COND 22 wherein the hot water having temperature lower than the refrigerant received in the COND 22 is used to condense the refrigerant received therein, thus generating condensed refrigerant and further heated water having temperature in the range of 50-98° C. which is used for the heating applications. The heated water from the COND 22 is fed to the HR 16. In the HR 16, the hot water further extracts heat from the heat input fed in the GEN 14, producing further heated water, which is used for subsequent applications.

TECHNICAL ADVANCEMENTS

An apparatus and a method thereof, for providing both heating and refrigeration, only refrigeration, and only heating, under the conditions of high temperature heat input and low temperature heat input; in accordance with the present invention has several technical advantages including but not limited to the realization of:

the apparatus reduces the overall energy utilized for generating hot water as compared to the conventional hot water generators;

the apparatus reduces the $CO_2$ emissions, thus eco-friendly;

the apparatus can be used to provide heating and refrigeration simultaneously, thus, additional electrical input, heat input or separate components are not required;

the apparatus reduces the scope of utilities used in day-to-day handling operation;

the apparatus can be conveniently used under various operating conditions;

the apparatus can be operated to provide both heating and refrigeration, only heating, and only refrigeration, depending upon the heat input available and the customer requirement.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. An apparatus for providing both heating and refrigeration, only refrigeration and only heating, under the conditions of high temperature heat input and low temperature heat input, said apparatus comprising a condenser, a vapor generator, a low pressure evaporator, a low pressure absorber, a high pressure evaporator, a high pressure absorber, a flash heat exchanger, a first low temperature heat exchanger, a second low temperature heat exchanger and a heat recovery unit, optionally comprising a low temperature generator, a drain heat exchanger and a high temperature heat exchanger; characterized in that:

the condenser is connected selectively to a set of equipment selected from a group consisting of the following sets: (i) the high pressure absorber, the flash heat exchanger and the drain heat exchanger; and (ii) the high pressure absorber, the heat recovery unit, the flash heat exchanger and the drain heat exchanger; and (iii) the high pressure absorber; and (iv) the high pressure absorber and the flash heat exchanger; and (v) the high pressure absorber, the heat recovery unit and the flash heat exchanger;

the vapor generator is connected selectively to a set of equipment selected from a group consisting of the following sets: (i) the low temperature generator, the high temperature heat exchanger and the heat recovery unit; and (ii) the low temperature generator, the low pressure evaporator, the high temperature heat exchanger and the heat recovery unit; and (iii) the heat recovery unit, the first low temperature heat exchanger and the second low temperature heat exchanger;

the low pressure evaporator cooperating with the low pressure absorber is connected selectively to a set of equipment selected from a group consisting of the following sets: (i) the high pressure evaporator; and (ii) the vapor generator;

the low pressure absorber cooperating with the low pressure evaporator is connected selectively to a set of equipment selected from a group consisting of the following sets: (i) the high pressure evaporator, the first low temperature heat exchanger and the flash heat exchanger; and (ii) the high pressure evaporator, the first low temperature heat exchanger, the flash heat exchanger and the high temperature heat exchanger; and (iii) the high pressure absorber; and (iv) the flash heat exchanger, the first low temperature heat exchanger and the high temperature heat exchanger; and (v) the high pressure evaporator, the flash heat exchanger and the second low temperature heat exchanger; and (vi) the high pressure evaporator, the flash heat exchanger, the first low temperature heat exchanger and the second low temperature heat exchanger;

the high pressure evaporator cooperating with the high pressure absorber is connected selectively to a set of equipment selected from a group consisting of the following sets: (i) the low pressure evaporator, the low pressure absorber and the flash heat exchanger; and (ii) the low pressure evaporator;

the high pressure absorber cooperating with the high pressure evaporator is connected selectively to a set of equipment selected from a group consisting of the following sets: (i) the condenser, the heat recovery unit, the first low temperature heat exchanger, the flash heat exchanger and the second low temperature heat exchanger; and (ii) the condenser, the first low temperature heat exchanger, the flash heat exchanger and the second low temperature heat exchanger; and (iii) the condenser, the heat recovery unit, the first low temperature heat exchanger, the flash heat exchanger, the high temperature heat exchanger and the second low temperature heat exchanger; and (iv) the condenser and the low pressure absorber; and (v) the condenser, the heat recovery unit and the first low temperature heat exchanger; and (vi) the condenser and the first low temperature heat exchanger; and (vii) the condenser, the heat recovery unit, the flash heat exchanger and the first low temperature heat exchanger; and (viii) the condenser, the flash heat exchanger and the first low temperature heat exchanger;

the flash heat exchanger is connected selectively to a set of equipment selected from a group consisting of the following sets: (i) the condenser, the high pressure evaporator, the low pressure absorber, the high pressure absorber and the drain heat exchanger; and (ii) the low pressure absorber and the drain heat exchanger; and (iii) the condenser, the high pressure evaporator, the low pressure absorber and the second low temperature heat exchanger; and (iv) the condenser, the high pressure evaporator, the low pressure absorber, the high pressure absorber and the second low temperature heat exchanger;

the first low temperature heat exchanger is connected selectively to a set of equipment selected from a group consisting of the following sets: (i) the low pressure absorber, the high pressure absorber and the second low temperature heat exchanger; and (ii) the low pressure absorber and the second low temperature heat exchanger; and (iii) the high pressure absorber and the vapor generator; and (iv) the low pressure absorber, the high pressure absorber and the vapor generator;

the second low temperature heat exchanger is connected selectively to a set of equipment selected from a group consisting of the following sets: (i) the high pressure absorber, the first low temperature heat exchanger, the high temperature heat exchanger and the low temperature generator; and (ii) the first low temperature heat exchanger and the high temperature heat exchanger; and (iii) the low pressure absorber, the flash heat exchanger and the vapor generator;

the heat recovery unit is connected selectively to a set of equipment selected from a group consisting of the following sets: (i) the high pressure absorber and the vapor generator; and (ii) the condenser and the vapor generator; and (iii) the vapor generator;

the low temperature generator is connected selectively to a set of equipment selected from a group consisting of the following sets: (i) the vapor generator, the high temperature heat exchanger, the drain heat exchanger and the second low temperature heat exchanger; and (ii) the vapor generator, the drain heat exchanger and the second low temperature heat exchanger;

the drain heat exchanger is connected selectively to a set of equipment selected from a group consisting of the following sets: (i) the low temperature generator, the condenser, the high temperature heat exchanger and the flash heat exchanger; and (ii) the low temperature generator, the condenser and the flash heat exchanger; and (iii) the flash heat exchanger and the high temperature heat exchanger; and the high temperature heat exchanger is connected selectively to a set of equipment selected from a group consisting of the following sets: (i) the vapor generator, the low temperature generator, the second low temperature heat exchanger and the drain heat exchanger; and (ii) the vapor generator, the low temperature generator and the second low temperature heat exchanger; and (iii) the vapor generator, the second low temperature heat exchanger and the drain heat exchanger; and (iv) the vapor generator, the second low temperature heat exchanger, the low pressure absorber and the high pressure absorber; and (v) the vapor generator, the low pressure absorber, second low temperature heat exchanger and the drain heat exchanger.

2. The apparatus as claimed in claim 1, wherein for achieving both heating and refrigeration under the condition of high temperature heat input, said apparatus comprises:
(i) the vapor generator adapted to receive a high temperature heat input having temperature in the range of 130-220° C. and a refrigerant-absorbent mixture, to provide a concentrated absorbent and refrigerant vapors;
(ii) the high temperature heat exchanger adapted to receive the concentrated absorbent from the vapor generator, to provide a heat extracted concentrated absorbent;
(iii) the low temperature generator adapted to receive the heat extracted concentrated absorbent from the high temperature heat exchanger and the refrigerant vapors from the vapor generator, to provide a further concentrated absorbent, refrigerant condensate and vapors;
(iv) the drain heat exchanger adapted to receive the refrigerant condensate from the low temperature generator, to provide a cooled and condensed refrigerant;
(v) the condenser adapted to receive refrigerant vapors from the low temperature generator and condensed refrigerant from the drain heat exchanger and hot water having temperature in the range of 45-90° C., to provide a further condensed refrigerant and a further heated water;
(vi) the flash heat exchanger adapted to receive the further condensed refrigerant from the condenser, to provide a cooled further condensed refrigerant;
(vii) the second low temperature heat exchanger adapted to receive the further concentrated absorbent from the low temperature generator, to provide a cooled further concentrated absorbent;
(viii) the high pressure evaporator adapted to receive the cooled further condensed refrigerant from the flash heat exchanger and water, to provide cooled water and a refrigerant;
(ix) the high pressure absorber adapted to receive a first portion of the cooled further concentrated absorbent from the second low temperature heat exchanger and the further heated water leaving the condenser, to provide the refrigerant-absorbent mixture which is fed to the vapor generator and hot water having temperature in the range of 50-98° C.;
(x) the first low temperature heat exchanger adapted to receive a second portion of the cooled further concentrated absorbent from the second low temperature heat exchanger, to provide a further cooled further concentrated absorbent;
(xi) the low pressure absorber adapted to receive the further cooled further concentrated absorbent from the first low temperature heat exchanger and cooled water from the high pressure evaporator, to provide heat gained water and refrigerant-absorbent mixture which is fed to the vapor generator;
(xii) the low pressure evaporator adapted to receive a portion of the refrigerant from the high pressure evaporator and water having temperature in the range 5-40° C., to provide water having temperature in the range of 0-35° C. and the refrigerant; and
(xiii) the heat recovery unit adapted to receive the hot water having temperature in the range of 50-98° C. from the high pressure absorber.

3. The apparatus as claimed in claim 1, wherein for achieving both heating and refrigeration under the condition of high temperature heat input, said apparatus comprises:
(i) the vapor generator adapted to receive a high temperature heat input having temperature in the range of 130-220° C. and a refrigerant-absorbent mixture, to provide a concentrated absorbent and refrigerant vapors;
(ii) the high temperature heat exchanger adapted to receive the concentrated absorbent from the vapor generator, to provide a heat extracted concentrated absorbent;
(iii) the low temperature generator adapted to receive the heat extracted concentrated absorbent from the high temperature heat exchanger and the refrigerant vapors from the vapor generator, to provide a further concentrated absorbent, refrigerant condensate and refrigerant vapors;
(iv) the drain heat exchanger adapted to receive the refrigerant condensate from the low temperature generator, to provide condensed refrigerant;
(v) the condenser adapted to further condense the refrigerant vapors from low temperature generator and condensed refrigerant from the drain heat exchanger by using hot water, to provide a further condensed refrigerant and hot water having temperature in the range of 50-98° C.;
(vi) the flash heat exchanger adapted to receive the further condensed refrigerant from the condenser, to provide a cooled further condensed refrigerant;
(vii) the second low temperature heat exchanger adapted to receive the further concentrated absorbent from the low temperature generator, to provide a cooled further concentrated absorbent;
(viii) the high pressure evaporator adapted to receive the cooled further condensed refrigerant from the flash heat exchanger and water, to provide cooled water and a refrigerant;
(ix) the high pressure absorber adapted to receive a first portion of the cooled further concentrated absorbent from the second low temperature heat exchanger and hot water having temperature in the range 45-90° C., to provide the refrigerant-absorbent mixture which is fed to the vapor generator and further heated water which is fed to the condenser;

(x) the first low temperature heat exchanger adapted to receive a second portion of the cooled further concentrated absorbent from the second low temperature heat exchanger, to provide a further cooled further concentrated absorbent;

(xi) the low pressure absorber adapted to receive the further cooled further concentrated absorbent from the first low temperature heat exchanger and cooled water from the high pressure evaporator, to provide heat gained water and refrigerant-absorbent mixture which is fed to the vapor generator;

(xii) the low pressure evaporator adapted to vaporize a portion of the refrigerant from the high pressure evaporator by taking heat from water having temperature in the range 5-40° C., to provide refrigerant, refrigerant vapors and water having temperature in the range of 0-35° C.; and (xiii) the heat recovery unit adapted to receive the further heated water from the condenser.

4. The apparatus as claimed in claim 1, wherein for achieving both heating and refrigeration under the condition of high temperature heat input, said apparatus comprises:

(i) the low temperature generator adapted to extract heat from refrigerant vapors, to provide a moderately concentrated absorbent mixture, refrigerant condensate and refrigerant vapors;

(ii) the high temperature heat exchanger adapted to receive the moderately concentrated absorbent mixture from the low temperature generator, to provide a heat gained moderately concentrated absorbent mixture;

(iii) the vapor generator adapted to receive a high temperature heat input having temperature in the range 130-220° C. and the heat gained moderately concentrated absorbent mixture, to provide a concentrated absorbent and refrigerant vapors which are fed to the low temperature generator;

(iv) the second low temperature heat exchanger adapted to receive the concentrated absorbent from the vapor generator after being passed through the high temperature heat exchanger, to provide a cooled concentrated absorbent;

(v) the drain heat exchanger adapted to receive the refrigerant condensate from the low temperature generator, to provide condensed refrigerant;

(vi) the condenser adapted to receive refrigerant vapors from low temperature generator and condensed refrigerant from the drain heat exchanger and hot water having temperature in the range of 45-90° C., to provide a further condensed refrigerant and a further heated water;

(vii) the flash heat exchanger adapted to receive the further condensed refrigerant from the condenser, to provide a cooled further condensed refrigerant;

(viii) the high pressure evaporator adapted to receive the cooled further condensed refrigerant from the flash heat exchanger and water, to provide cooled water and a refrigerant;

(ix) the high pressure absorber adapted to receive a first portion of the cooled concentrated absorbent from the second low temperature heat exchanger and the further heated water leaving the condenser, to provide a refrigerant-absorbent mixture which is fed to the low temperature generator and hot water having temperature in the range of 50-98° C.;

(x) the first low temperature heat exchanger adapted to receive a second portion of the cooled concentrated absorbent from the second low temperature heat exchanger, to provide a further cooled concentrated absorbent;

(xi) the low pressure absorber adapted to receive the further cooled concentrated absorbent from the first low temperature heat exchanger and cooled water from the high pressure evaporator, to provide heat gained water and the refrigerant-absorbent mixture which is fed to the low temperature generator;

(xii) the low pressure evaporator adapted to receive a portion of the refrigerant from the high pressure evaporator and water having temperature in the range 5-40° C., to provide water having temperature in the range of 0-35° C. and refrigerant; and (xiii) the heat recovery unit adapted to receive the hot water having temperature in the range of 50-98° C. from the high pressure absorber.

5. The apparatus as claimed in claim 1, wherein for achieving both heating and refrigeration under the condition of high temperature heat input, said apparatus comprises:

(i) the low temperature generator adapted to extract heat from refrigerant vapors, to provide a moderately concentrated absorbent mixture, refrigerant condensate and refrigerant vapors;

(ii) the high temperature heat exchanger adapted to receive the moderately concentrated absorbent mixture from the low temperature generator, to provide a heat gained moderately concentrated absorbent mixture;

(iii) the vapor generator adapted to receive a high temperature heat input having temperature in the range of 130-220° C. and the heat gained moderately concentrated absorbent mixture, to provide a concentrated absorbent and refrigerant vapors which are fed to the low temperature generator;

(iv) the second low temperature heat exchanger adapted to receive the concentrated absorbent from the vapor generator after being passed through the high temperature heat exchanger, to provide a cooled concentrated absorbent;

(v) the drain heat exchanger adapted to receive the refrigerant condensate from the low temperature generator, to provide condensed refrigerant;

(vi) the condenser adapted to condense refrigerant vapors from low temperature generator and condensed refrigerant from the drain heat exchanger by using hot water, to provide a further condensed refrigerant and hot water having temperature in the range of 50-98° C.;

(vii) the flash heat exchanger adapted to receive the further condensed refrigerant from the condenser, to provide a cooled further condensed refrigerant;

(viii) the high pressure evaporator adapted to receive the cooled further condensed refrigerant from the flash heat exchanger and water, to provide cooled water and a refrigerant;

(ix) the high pressure absorber adapted to receive a first portion of the cooled concentrated absorbent from the second low temperature heat exchanger and hot water having temperature in the range 45-90° C., to provide a refrigerant-absorbent mixture which is fed to the low temperature generator and further heated water is fed to the condenser;

(x) the first low temperature heat exchanger adapted to receive a second portion of the cooled concentrated absorbent from the second low temperature heat exchanger, to provide a further cooled concentrated absorbent;

(xi) the low pressure absorber adapted to receive the further cooled concentrated absorbent from the first low temperature heat exchanger and the further cooled water from the high pressure evaporator, to provide heat gained water and the refrigerant-absorbent mixture which is fed to the low temperature generator;

(xii) the low pressure evaporator adapted to vaporize a portion of the refrigerant from the high pressure evaporator by taking heat from water having temperature in the range 5-40° C., to provide water having temperature in the range of 0-35° C. and refrigerant; and (xiii) the heat recovery unit adapted to receive the further heated water from the condenser.

6. The apparatus as claimed in claim 1, wherein for achieving both heating and refrigeration under the condition of high temperature heat input, said apparatus comprises:

(i) the vapor generator adapted to receive a high temperature heat input having temperature in the range of 130-220° C. and a refrigerant-absorbent mixture, to provide a concentrated absorbent and refrigerant vapors;

(ii) the high temperature heat exchanger adapted to receive the concentrated absorbent from the vapor generator, to provide a heat extracted concentrated absorbent;

(iii) the low temperature generator adapted to extract heat from the refrigerant vapors, to provide a concentrated absorbent solution, refrigerant condensate and vapors;

(iv) the drain heat exchanger adapted to receive the refrigerant condensate from the low temperature generator, to provide condensed refrigerant;

(v) the condenser adapted to receive the refrigerant vapors from low temperature generator and condensed refrigerant from the drain heat exchanger and hot water having temperature in the range of 45-90° C., to provide a further condensed refrigerant and further heated water;

(vi) the flash heat exchanger adapted to receive the further condensed refrigerant from the condenser, to provide a cooled further condensed refrigerant;

(vii) the second low temperature heat exchanger adapted to receive the heat extracted concentrated absorbent from the high temperature heat exchanger and the concentrated absorbent solution from the low temperature generator, to provide a cooled concentrated absorbent;

(viii) the high pressure evaporator adapted to receive the cooled further condensed refrigerant from the flash heat exchanger and water, to provide cooled water and a refrigerant;

(ix) the high pressure absorber adapted to receive a first portion of the cooled concentrated absorbent from the second low temperature heat exchanger and the further heated water leaving the condenser, to provide the refrigerant-absorbent mixture which is fed to the vapor generator and low temperature generator and hot water having temperature in the range of 50-98° C.;

(x) the first low temperature heat exchanger adapted to receive a second portion of the cooled concentrated absorbent from the second low temperature heat exchanger, to provide a further cooled concentrated absorbent;

(xi) the low pressure absorber adapted to receive the further cooled concentrated absorbent from the first low temperature heat exchanger and cooled water from the high pressure evaporator, to provide heat gained water and the refrigerant-absorbent mixture which is fed to the vapor generator and low temperature generator;

(xii) the low pressure evaporator adapted to receive a portion of the refrigerant from the high pressure evaporator and water having temperature in the range 5-40° C., to provide water having temperature in the range of 0-35° C. and refrigerant; and (xiii) the heat recovery unit adapted to receive the hot water having temperature in the range of 50-98° C. from the high pressure absorber.

7. The apparatus as claimed in claim 1, wherein for achieving both heating and refrigeration under the condition of high temperature heat input, said apparatus comprises:

(i) the vapor generator adapted to receive a high temperature heat input having temperature in the range of 130-220° C. and a refrigerant-absorbent mixture, to provide a concentrated absorbent and refrigerant vapors;

(ii) the high temperature heat exchanger adapted to receive a portion of a refrigerant-absorbent mixture and the concentrated absorbent from the vapor generator, to provide a heat extracted concentrated absorbent;

(iii) the low temperature generator adapted to extract heat from the refrigerant vapors, to provide a concentrated absorbent solution, refrigerant condensate and refrigerant vapors;

(iv) the drain heat exchanger adapted to receive the refrigerant vapors from the low temperature generator, to provide condensed refrigerant;

(v) the condenser adapted to receive the refrigerant vapors from low temperature generator and condensed refrigerant from the drain heat exchanger and hot water having temperature in the range of 45-90° C., to provide a further condensed refrigerant and further heated water;

(vi) the flash heat exchanger adapted to receive the further condensed refrigerant from the condenser, to provide a cooled further condensed refrigerant;

(vii) the second low temperature heat exchanger adapted to receive the heat extracted concentrated absorbent from the high temperature heat exchanger and the concentrated absorbent solution from the low temperature generator, to provide a cooled concentrated absorbent;

(viii) the high pressure evaporator adapted to receive the cooled further condensed refrigerant from the flash heat exchanger and water, to provide cooled water and a refrigerant;

(ix) the high pressure absorber adapted to receive a first portion of the cooled concentrated absorbent from the second low temperature heat exchanger and the further heated water leaving the condenser, to provide the refrigerant-absorbent mixture which is fed to the vapor generator and low temperature generator and hot water having temperature in the range of 50-98° C.;

(x) the first low temperature heat exchanger adapted to receive a second portion of the cooled concentrated absorbent from the second low temperature heat exchanger, to provide a further cooled concentrated absorbent;

(xi) the low pressure absorber adapted to receive the further cooled concentrated absorbent from the first low temperature heat exchanger and cooled water from the high pressure evaporator, to provide the refrigerant-absorbent mixture which is fed to the vapor generator and the low temperature generator and heat gained water;

(xii) the low pressure evaporator adapted to receive a portion of the refrigerant from the high pressure evaporator and water having temperature in the range 5-40° C., to provide water having temperature in the range of 0-35° C. and refrigerant; and (xiii) the heat recovery unit adapted to receive the hot water having temperature in the range of 50-98° C. from the high pressure absorber.

8. The apparatus as claimed in claim 1, wherein for achieving both heating and refrigeration under the condition of high temperature heat input, said apparatus comprises:
(i) the low temperature generator adapted to extract heat from refrigerant vapors, to provide a moderately concentrated absorbent mixture, refrigerant condensate and refrigerant vapors;
(ii) the high temperature heat exchanger adapted to receive a first portion of the moderately concentrated absorbent mixture from the low temperature generator, to provide a heated moderately concentrated absorbent mixture;
(iii) the vapor generator adapted to receive a high temperature heat input having temperature in the range of 130-220° C. and the heated moderately concentrated absorbent mixture, to provide a concentrated absorbent and refrigerant vapors which are fed to the low temperature generator;
(iv) the second low temperature heat exchanger adapted to receive the concentrated absorbent from the vapor generator after being passed through the high temperature heat exchanger and a portion of the moderately concentrated absorbent mixture from the low temperature generator, to provide a cooled concentrated absorbent;
(v) the drain heat exchanger adapted to receive the refrigerant condensate from the low temperature generator, to provide condensed refrigerant;
(vi) the condenser adapted to receive the refrigerant vapors from low temperature generator and condensed refrigerant from the drain heat exchanger and hot water having temperature in the range of 45-90° C., to provide a further condensed refrigerant and further heated water;
(vii) the flash heat exchanger adapted to receive the further condensed refrigerant from the condenser, to provide a cooled further condensed refrigerant;
(viii) the high pressure evaporator adapted to receive the cooled further condensed refrigerant from the flash heat exchanger and water, to provide cooled water and a refrigerant;
(ix) the high pressure absorber adapted to receive a first portion of the cooled concentrated absorbent from the second low temperature heat exchanger and the further heated water leaving the condenser, to provide a refrigerant-absorbent mixture which is fed to the low temperature generator and hot water having temperature in the range of 50-98° C.;
(x) the first low temperature heat exchanger adapted to receive a second portion of the cooled concentrated absorbent from the second low temperature heat exchanger, to provide a further cooled concentrated absorbent;
(xi) the low pressure absorber adapted to receive the further cooled concentrated absorbent from the first low temperature heat exchanger and cooled water from the high pressure evaporator, to provide heat gained water and the refrigerant-absorbent mixture which is fed to the low temperature generator;
(xii) the low pressure evaporator adapted to receive a portion of the refrigerant from the high pressure evaporator and water having temperature in the range 5-40° C., to provide water having temperature in the range of 0-35° C. and refrigerant; and
(xiii) the heat recovery unit adapted to receive the hot water having temperature in the range of 50-98° C. from the high pressure absorber.

9. The apparatus as claimed in claim 1, wherein for achieving only refrigeration under the condition of high temperature heat input, said apparatus comprises:
(i) a high pressure evaporator and a low pressure evaporator, both adapted to receive condensed refrigerant and water having temperature in the range of 5-40° C., to provide refrigerant vapors and water having temperature in the range of 0-35° C.;
(ii) a high pressure absorber and a low pressure absorber, both adapted to receive concentrated absorbent which absorbs the refrigerant vapors released in the high pressure evaporator and the low pressure evaporator and water circulated therein having temperature in the range of 25-35° C., to provide a refrigerant-absorbent mixture; and
(iii) a plurality of valves placed in the conduits between the high pressure evaporator and the low pressure evaporator, the low pressure absorber and the high pressure absorber, and the high pressure evaporator and the low pressure absorber, adapted to change the direction of flow of water and the water, to permit the conversion of the heating and refrigeration cycle to only refrigeration; optionally comprising an automation means having a control logic to switch the operation of the plurality of valves from heating and refrigeration cycle to only refrigeration.

10. The apparatus as claimed in claim 1, wherein for achieving only heating under the conditions of high or low temperature heat inputs, said apparatus comprises:
(i) a vapor generator adapted to receive a heat input having temperature in the range 90-220° C. and a heated refrigerant-absorbent mixture to provide a concentrated absorbent and refrigerant vapors;
(ii) a high temperature heat exchanger adapted to receive the concentrated absorbent from the vapor generator and a refrigerant-absorbent mixture to provide a heat extracted concentrated absorbent and heated refrigerant-absorbent mixture which is fed to the vapor generator;
(iii) a low pressure evaporator adapted to receive the refrigerant vapors from the vapor generator, and hot water having temperature in the range of 45-90° C. to provide refrigerant vapors and heated water having temperature in the range of 50-98° C.;
(iv) a low pressure absorber adapted to receive the heat extracted concentrated absorbent from the high temperature heat exchanger to absorb the refrigerant vapors and provide the refrigerant-absorbent mixture which is first fed to the high temperature heat exchanger and then sent to the vapor generator; and
(v) a plurality of valves placed in the conduits between the vapor generator and the low pressure evaporator and the high temperature heat exchanger and the low pressure absorber, adapted to change the direction of flow of the refrigerant vapors and the concentrated absorbent, to permit the conversion of both heating and refrigeration cycle to only heating; optionally comprising an automation means having a control logic to switch the operation of the plurality of valves from both heating and refrigeration to only heating.

11. The apparatus as claimed in claim 1, wherein for achieving both heating and refrigeration under the condition of low temperature heat input, said apparatus comprises:
(i) the vapor generator adapted to receive a low temperature heat input having temperature in the range of 90-170° C. and a refrigerant-absorbent mixture, to provide a concentrated absorbent and subsequently release refrigerant vapors;

(ii) the condenser adapted to condense refrigerant vapors by using hot water having temperature in the range of 45-90° C., to provide condensed refrigerant;

(iii) the flash heat exchanger adapted to extract heat from the condensed refrigerant received therein from the condenser, to provide a cooled condensed refrigerant;

(iv) the first low temperature heat exchanger and a second low temperature heat exchanger adapted to extract heat from the concentrated absorbent from the vapor generator, to provide a cooled concentrated absorbent;

(v) the high pressure evaporator adapted to vaporize the cooled condensed refrigerant from the flash heat exchanger by taking heat from water circulated therein, to provide a refrigerant and refrigerant vapors and subsequently generate cooled water;

(vi) the high pressure absorber adapted to receive the cooled concentrated absorbent from the first low temperature heat exchanger and the hot water leaving the condenser, to provide the refrigerant-absorbent mixture which is fed to the vapor generator and hot water having temperature in the range of 50-98° C.;

(vii) the low pressure absorber adapted to receive the cooled concentrated absorbent from the second low temperature heat exchanger and cooled water from the high pressure evaporator, to provide heat gained water and the refrigerant-absorbent mixture which is fed to the vapor generator;

(viii) the low pressure evaporator adapted to vaporize a portion of the refrigerant from the high pressure evaporator by taking heat from water having temperature in the range 5-40° C., to provide a refrigerant and refrigerant vapors and subsequently generate water having temperature in the range of 0-35° C.; and (ix) the heat recovery unit adapted to receive the hot water having temperature in the range of 50-98° C. from the high pressure absorber.

12. The apparatus as claimed in claim 1, wherein for achieving both heating and refrigeration under the condition of low temperature heat input, said apparatus comprises:

(i) the vapor generator adapted to receive a low temperature heat input having temperature in the range of 90-170° C. and a refrigerant-absorbent mixture, to provide a concentrated absorbent and subsequently release refrigerant vapors;

(ii) the condenser adapted to condense refrigerant vapors by using heated water, to provide condensed refrigerant and further heated water having temperature in the range of 50-98° C.;

(iii) the flash heat exchanger adapted to extract heat from the condensed refrigerant received therein from the condenser, to provide a cooled condensed refrigerant;

(iv) the first low temperature heat exchanger and a second low temperature heat exchanger adapted to extract heat from the concentrated absorbent leaving the vapor generator, to provide a cooled concentrated absorbent;

(v) the high pressure absorber adapted to receive the cooled concentrated absorbent from the first low temperature heat exchanger and hot water having temperature in the range of 45-90° C., to provide the refrigerant-absorbent mixture which is fed to the vapor generator and heated water which is fed to the condenser;

(vi) the high pressure evaporator adapted to vaporize the cooled condensed refrigerant from the flash heat exchanger by taking heat from water circulated therein, to provide a refrigerant and refrigerant vapors and subsequently generate cooled water;

(vii) the low pressure absorber adapted to receive the cooled concentrated absorbent from the second low temperature heat exchanger and cooled water from the high pressure evaporator, to provide heat gained water and the refrigerant-absorbent mixture which is fed to the vapor generator;

(viii) the low pressure evaporator adapted to vaporize a portion of the refrigerant from the high pressure evaporator by taking heat from water having temperature in the range 5-40° C., to provide a refrigerant and refrigerant vapors and subsequently generate water having temperature in the range of 0-35° C.; and (ix) the heat recovery unit adapted to receive the hot water having temperature in the range of 50-98° C. from the condenser.

13. The apparatus as claimed in claim 1, wherein the heat input is selected from a group consisting of steam, combustion of fuel, exhaust gas and superheated water.

14. The apparatus as claimed in claim 1, wherein the refrigerant-absorbent pair is selected from a group consisting of water-lithium bromide, ammonia-water and the like.

15. The apparatus as claimed in claim 1, wherein said apparatus is provided with pumping and piping means adapted to circulate the absorbent, the refrigerant and water.

16. The apparatus as claimed in claim 1, wherein said apparatus is provided with programmable logic controls adapted to operate a plurality of valves which are provided to control the flow of the absorbent, the refrigerant and the water during the operation.

17. A method for achieving both heating and refrigeration, only refrigeration, and only heating, under the condition selected from a group of conditions consisting of high temperature heat input and low temperature heat input, using an apparatus as claimed in claim 1.

18. The method as claimed in claim 17, wherein for achieving both heating and refrigeration under the condition of high temperature heat input, said method comprising the following steps:

(i) boiling a refrigerant-absorbent mixture in the vapor generator by using a high temperature heat input having temperature in the range of 130-220° C. providing a concentrated absorbent and refrigerant vapors;

(ii) extracting heat from the concentrated absorbent in the high temperature heat exchanger providing a heat extracted concentrated absorbent;

(iii) concentrating the heat extracted concentrated absorbent from the high temperature heat exchanger in the low temperature generator by using the vapors released from the vapor generator providing a further concentrated absorbent, refrigerant condensate and refrigerant vapors;

(iv) cooling the refrigerant condensate leaving low temperature generator in the drain heat exchanger providing condensed refrigerant;

(v) condensing the refrigerant vapors from low temperature generator and condensed refrigerant from the drain heat exchanger in the condenser by using hot water having temperature in the range of 45-90° C. providing a further condensed refrigerant and further heated water;

(vi) cooling the further condensed refrigerant from the condenser in the flash heat exchanger providing a cooled condensed refrigerant;

(vii) extracting heat from the further concentrated absorbent leaving the low temperature generator in the second low temperature heat exchanger providing a cooled further concentrated absorbent;

(viii) vaporizing the cooled condensed refrigerant from the flash heat exchanger in the high pressure evaporator by utilizing heat from the water circulated therein providing refrigerant vapors and refrigerant;

(ix) absorbing the refrigerant vapors released in the high pressure evaporator in a first portion of the cooled further concentrated absorbent leaving second low temperature heat exchanger and sprayed in the high pressure absorber providing the refrigerant-absorbent mixture which is fed to the vapor generator and heat which is extracted by the hot water leaving temperature in the range of 50-98° C.;

(x) extracting heat from a second portion of the cooled further concentrated absorbent in the first low temperature heat exchanger providing a further cooled further concentrated absorbent;

(xi) vaporizing the refrigerant received in the low pressure evaporator from the high pressure evaporator by absorbing heat from water circulated therein providing a refrigerant vapors and refrigerant and water having temperature in the range of 0-35° C.;

(xii) absorbing the refrigerant vapors released in the low pressure evaporator in the further cooled further concentrated absorbent sprayed in the low pressure absorber from the first low temperature heat exchanger providing the refrigerant-absorbent mixture which is fed to the vapor generator and heat which is absorbed by water circulated therein;

(xiii) heating the refrigerant-absorbent mixture leaving the high pressure absorber and the low pressure absorber by passing through the first and the second low temperature heat exchanger, flash heat exchanger and drain heat exchanger providing a heated refrigerant-absorbent mixture;

(xiv) conveying the heated refrigerant-absorbent mixture through the high temperature heat exchanger providing a further heated refrigerant-absorbent mixture which is fed to the vapor generator for boiling; and (xv) reclaiming the heat from the hot water in the heat recovery unit.

19. The method as claimed in claim 17, wherein for achieving both heating and refrigeration under the condition of high temperature heat input, said method comprising the following steps:

(i) utilizing heat from refrigerant vapors in a low temperature generator for providing a moderately concentrated absorbent, refrigerant condensate and refrigerant vapors;

(ii) heating the moderately concentrated absorbent mixture in a high temperature heat exchanger providing a heated moderately concentrated absorbent mixture;

(iii) boiling the heated moderately concentrated absorbent mixture in a vapor generator by using a high temperature heat input having temperature in the range of 130-220° C. for providing a concentrated absorbent and refrigerant vapors which are fed to the low temperature generator;

(iv) cooling the refrigerant condensate leaving low temperature generator in a drain heat exchanger providing condensed refrigerant;

(v) condensing the refrigerant vapors from the low temperature generator and condensed refrigerant from the drain heat exchanger in a condenser by using hot water having temperature in the range of 45-90° C. providing a further condensed refrigerant and further heated water;

(vi) cooling the further condensed refrigerant from the condenser in a flash heat exchanger providing a cooled condensed refrigerant;

(vii) extracting heat from the concentrated absorbent leaving the vapor generator in a high temperature heat exchanger first and then in low temperature heat exchangers providing a cooled concentrated absorbent;

(viii) vaporizing the cooled condensed refrigerant from the flash heat exchanger in a high pressure evaporator by utilizing heat from the water circulated therein, providing refrigerant vapors and refrigerant;

(ix) absorbing the refrigerant vapors released in the high pressure evaporator in a first portion of the cooled concentrated absorbent leaving second low temperature heat exchanger and sprayed in high pressure absorber, providing a refrigerant-absorbent mixture which is fed to the low temperature generator and heat which is extracted by the hot water leaving temperature in the range of 50-98° C.;

(x) extracting heat from a second portion of the cooled concentrated absorbent in a first low temperature heat exchanger providing a further cooled concentrated absorbent;

(xi) vaporizing the refrigerant received in a low pressure evaporator from the high pressure evaporator by absorbing heat from water circulated therein providing refrigerant vapors and refrigerant and water having temperature in the range of 0-35° C.;

(xii) absorbing the refrigerant vapors released in the low pressure evaporator in the further cooled concentrated absorbent sprayed in the low pressure absorber from the first low temperature heat exchanger, providing the refrigerant-absorbent mixture which is fed to the low temperature generator and heat which is absorbed by water circulated therein;

(xiii) heating the refrigerant-absorbent mixture leaving the high pressure absorber and the low pressure absorber by passing through the first and the second low temperature heat exchanger, flash heat exchanger and drain heat exchanger, providing a heated refrigerant-absorbent mixture;

(xiv) receiving the heated refrigerant-absorbent mixture in the low temperature generator for providing the moderately concentrated refrigerant-absorbent mixture; and (xv) reclaiming the heat from the hot water in a heat recovery unit.

20. The method as claimed in claim 17, wherein for achieving both heating and refrigeration under the condition of high temperature heat input, said method comprising the following steps:

(i) boiling a refrigerant-absorbent mixture in a vapor generator by using a high temperature heat input having temperature in the range of 130-220° C. for providing a concentrated absorbent and refrigerant vapors;

(ii) extracting heat from the concentrated absorbent in a high temperature heat exchanger providing a heat extracted concentrated absorbent;

(iii) utilizing heat from the vapors released in the vapor generator in a low temperature generator for providing a concentrated absorbent solution, refrigerant condensate and refrigerant vapors;

(iv) cooling the refrigerant condensate in a drain heat exchanger providing condensed refrigerant;

(v) condensing the refrigerant vapors from low temperature generator and condensed refrigerant from the drain heat exchanger in a condenser by using hot water having temperature in the range of 45-90° C. providing further condensed refrigerant and further heated water;

(vi) cooling the further condensed refrigerant from the condenser in a flash heat exchanger providing a cooled condensed refrigerant;

(vii) cooling the heat extracted concentrated absorbent from the high temperature heat exchanger and the concentrated absorbent solution from the low temperature generator in a second low temperature heat exchanger providing a cooled concentrated absorbent;

(viii) vaporizing the cooled condensed refrigerant from the flash heat exchanger in a high pressure evaporator by utilizing heat from the water circulated therein, providing refrigerant vapors and refrigerant;

(ix) absorbing the refrigerant vapors released in the high pressure evaporator in a first portion of the cooled concentrated absorbent leaving second low temperature heat exchanger in a high pressure absorber, providing the refrigerant-absorbent mixture which is fed to the vapor generator and the low temperature generator and heat which is extracted by the hot water leaving temperature in the range of 50-98° C.;

(x) extracting heat from a second portion of the cooled concentrated absorbent in a first low temperature heat exchanger providing a further cooled concentrated absorbent;

(xi) vaporizing the refrigerant received in a low pressure evaporator from the high pressure evaporator by absorbing heat from water circulated therein, providing refrigerant vapors and refrigerant and water having temperature in the range of 0-35° C.;

(xii) absorbing the refrigerant vapors released in the low pressure evaporator in the further cooled concentrated absorbent sprayed in the low pressure absorber from the first low temperature heat exchanger, providing the refrigerant-absorbent mixture which is fed to the vapor generator and the low temperature generator and heat which is absorbed by water circulated therein;

(xiii) heating the refrigerant-absorbent mixture leaving the high pressure absorber and the low pressure absorber by passing through the first and the second low temperature heat exchanger, flash heat exchanger and drain heat exchanger, providing a heated refrigerant-absorbent mixture;

(xiv) conveying the heated refrigerant-absorbent mixture to the high temperature heat exchanger providing a further heated refrigerant-absorbent mixture which is fed to the vapor generator for boiling and the low temperature generator for providing the concentrated absorbent solution; and (xv) reclaiming the heat from the hot water in a heat recovery.

21. The method as claimed in claim 17, wherein for achieving both heating and refrigeration under the condition of high temperature heat input, said method comprising the following steps:

(i) boiling a refrigerant-absorbent mixture in a vapor generator by using a high temperature heat input having temperature in the range of 130-220° C. for providing a concentrated absorbent and refrigerant vapors;

(ii) extracting heat from the concentrated absorbent in a high temperature heat exchanger providing a heat extracted concentrated absorbent;

(iii) utilizing heat from the vapors released in the vapor generator in a low temperature generator for providing a concentrated absorbent solution, refrigerant condensate and refrigerant vapors;

(iv) cooling the refrigerant condensate from low temperature generator in a drain heat exchanger providing condensed refrigerant;

(v) condensing refrigerant vapors from low temperature generator and the condensed refrigerant from the drain heat exchanger in a condenser by using hot water having temperature in the range of 45-90° C. providing further condensed refrigerant and further heated water;

(vi) cooling the further condensed refrigerant from the condenser in a flash heat exchanger providing a cooled condensed refrigerant;

(vii) cooling the heat extracted concentrated absorbent from the high temperature heat exchanger and the concentrated absorbent solution from the low temperature generator in a second low temperature heat exchanger, providing a cooled concentrated absorbent;

(viii) vaporizing the cooled condensed refrigerant from the flash heat exchanger in a high pressure evaporator by utilizing heat from the water circulated therein, providing refrigerant vapors and refrigerant;

(ix) absorbing the refrigerant vapors released in the high pressure evaporator in a portion of the cooled concentrated absorbent leaving second low temperature heat exchanger sprayed in a high pressure absorber, providing the refrigerant-absorbent mixture which is fed to the vapor generator and the low temperature generator and heat which is extracted by the hot water leaving temperature in the range of 50-98° C.;

(x) extracting heat from a second portion of the cooled concentrated absorbent in a first low temperature heat exchanger providing a further cooled concentrated absorbent;

(xi) vaporizing the refrigerant received in a low pressure evaporator from the high pressure evaporator by absorbing heat from water circulated therein providing refrigerant vapors and refrigerant and water having temperature in the range of 0-35° C.;

(xii) absorbing the refrigerant vapors released in the low pressure evaporator in the further cooled concentrated absorbent sprayed in the low pressure absorber from the first low temperature heat exchanger, providing the refrigerant-absorbent mixture which is fed to the vapor generator and the low temperature generator and heat which is absorbed by water circulated therein;

(xiii) receiving a first portion of the refrigerant-absorbent mixture leaving the high pressure absorber and the low pressure absorber in the first and the second low temperature heat exchangers, the flash heat exchanger and the drain heat exchanger to absorb heat and providing a heated refrigerant-absorbent mixture which is fed to the low temperature generator for concentrating;

(xiv) heating a second portion of the refrigerant-absorbent mixture leaving the high pressure absorber and the low pressure absorber in the high temperature heat exchanger before feeding to the vapor generator;

(xv) reclaiming the heat from the hot water in a heat recovery unit.

22. The method as claimed in claim 17, wherein for achieving both heating and refrigeration under the condition of high temperature heat input, said method comprising the following steps:

(i) utilizing heat from vapors in a low temperature generator for providing a moderately concentrated absorbent mixture, refrigerant condensate and refrigerant vapors;

(ii) heating a first portion of the moderately concentrated absorbent mixture in a high temperature heat exchanger providing a heated moderately concentrated absorbent mixture;

(iii) boiling the heated moderately concentrated absorbent mixture in a vapor generator by using a high temperature heat input having temperature in the range of 130-220° C. for providing a concentrated absorbent and refrigerant vapors which are fed to the low temperature generator;

(iv) cooling the refrigerant condensate leaving low temperature generator in a drain heat exchanger providing condensed refrigerant;

(v) condensing refrigerant vapors from low temperature generator and the condensed refrigerant from the drain heat exchanger in a condenser by using hot water having temperature in the range of 45-90° C. providing further condensed refrigerant and further heated water;

(vi) cooling the further condensed refrigerant from the condenser in a flash heat exchanger providing a cooled condensed refrigerant;

(vii) extracting heat from the concentrated absorbent leaving the vapor generator and a second portion of the moderately concentrated absorbent mixture from the low temperature generator in a second low temperature heat exchanger providing a cooled concentrated absorbent;

(viii) vaporizing the cooled condensed refrigerant from the flash heat exchanger in a high pressure evaporator by utilizing heat from the water circulated therein, providing refrigerant vapors and refrigerant;

(ix) absorbing the refrigerant vapors released in the high pressure evaporator in a first portion of the cooled concentrated absorbent leaving second low temperature heat exchanger in a high pressure absorber, providing a refrigerant-absorbent mixture which is fed to the low temperature generator and heat which is extracted by the hot water leaving temperature in the range of 50-98° C.;

(x) extracting heat from a second portion of the cooled concentrated absorbent in a first low temperature heat exchanger providing a further cooled concentrated absorbent;

(xi) vaporizing the refrigerant received in a low pressure evaporator from the high pressure evaporator by absorbing heat from water circulated therein, providing refrigerant vapors and refrigerant and water having temperature in the range of 0-35° C.;

(xii) absorbing the refrigerant vapors released in the low pressure evaporator in the further cooled concentrated absorbent sprayed in the low pressure absorber from the first low temperature heat exchanger, providing the refrigerant-absorbent mixture which is fed to the low temperature generator and heat which is absorbed by water circulated therein;

(xiii) heating the refrigerant-absorbent mixture leaving the high pressure absorber and the low pressure absorber by passing through the first and the second low temperature heat exchanger, flash heat exchanger and drain heat exchanger, providing a heated refrigerant-absorbent mixture;

(xiv) receiving the heated refrigerant-absorbent mixture in the low temperature generator for providing the moderately concentrated refrigerant-absorbent mixture; and (xv) reclaiming the heat from the hot water in a heat recovery unit.

23. The method as claimed in claim 17, wherein for achieving only refrigeration under the condition of high temperature heat input, said method comprising the following steps:

(i) directing water having temperature in the range of 5-40° C. through the high pressure evaporator and the low pressure evaporator by opening a plurality of valves provided in the conduits therein;

(ii) vaporizing condensed refrigerant received in the high pressure evaporator and the low pressure evaporator, to provide refrigerant vapors and water having temperature in the range of 0-35° C.; and (iii) absorbing the refrigerant vapors generated in the high pressure evaporator and the low pressure evaporator in a concentrated absorbent sprayed in a high pressure absorber and a low pressure absorber respectively, wherein water having temperature in the range of 25-35° C. is circulated there through by opening a plurality of valves provided therein, to provide a refrigerant-absorbent mixture which is treated to obtain the concentrated absorbent and heated water which is treated to obtain the condensed refrigerant, thus, continuing the process cycle.

24. The method as claimed in claim 17, wherein for achieving only heating under the conditions of high or low temperature heat inputs, said method comprising the following steps:

(i) boiling a heated refrigerant-absorbent mixture in a vapor generator by using a heat input having temperature in the range of 90-220° C. for providing a concentrated absorbent and refrigerant vapors;

(ii) extracting heat from the concentrated absorbent in a refrigerant-absorbent mixture in a high temperature heat exchanger, providing a heat extracted concentrated absorbent and a heated refrigerant-absorbent mixture which is fed to the vapor generator;

(iii) receiving the refrigerant vapors from the vapor generator in a low pressure evaporator through a valve provided in a conduit connecting the vapor generator and the low pressure evaporator, wherein hot water having temperature in the range of 45-90° C. is circulated for absorbing heat from the refrigerant vapors providing further heated water having temperature in the range of 50-98° C.; and (iv) absorbing the refrigerant vapors from the low pressure evaporator in the heat extracted concentrated absorbent sprayed in a low pressure absorber from the high temperature heat exchanger through a valve provided between the high temperature heat exchanger and the low pressure absorber, providing a refrigerant-absorbent mixture which is fed to the vapor generator, thus, continuing the process cycle.

25. The method as claimed in claim 17, wherein for achieving both heating and refrigeration under the condition of low temperature heat input, said method comprising the following steps:

(i) boiling a refrigerant-absorbent mixture in a vapor generator by using a low temperature heat input having temperature in the range of 90-170° C. for providing a concentrated absorbent and subsequently release refrigerant vapors;

(ii) cooling a first portion of the concentrated absorbent from the vapor generator in a first low temperature heat exchanger and a second portion of the concentrated absorbent in a second low temperature heat exchanger, providing a cooled concentrated absorbent;

(iii) condensing a refrigerant in the condenser by using hot water having temperature in the range of 45-90° C. providing condensed refrigerant and further heated water;

(iv) extracting heat from the condensed refrigerant in a flash heat exchanger providing a cooled condensed refrigerant;
(v) vaporizing the cooled condensed refrigerant from the flash heat exchanger in a high pressure evaporator by utilizing heat from water circulated therein providing refrigerant vapors and refrigerant;
(vi) absorbing the refrigerant vapors released in the high pressure evaporator in the cooled concentrated absorbent sprayed in a high pressure absorber from the first low temperature heat exchanger, providing the refrigerant-absorbent mixture which is fed to the vapor generator and heat which is extracted by hot water leaving temperature in the range 50-98° C.;
(vii) vaporizing the refrigerant received in a low pressure evaporator from the high pressure evaporator by absorbing heat from water circulated therein, providing refrigerant vapors and refrigerant and water having temperature in the range of 0-35° C.;
(viii) absorbing the refrigerant vapors released in the low pressure evaporator in the cooled concentrated absorbent sprayed in a low pressure absorber from the second low temperature heat exchanger, providing the refrigerant-absorbent mixture which is fed to the vapor generator and heat which is absorbed by water circulated therein;
(ix) heating the refrigerant-absorbent mixture leaving the high pressure absorber by passing through the first low temperature heat exchanger providing a heated refrigerant-absorbent mixture;
(x) heating the refrigerant-absorbent mixture leaving the low pressure absorber by passing through the flash heat exchanger and the second low temperature heat exchanger providing the heated refrigerant-absorbent mixture;
(xi) receiving the heated refrigerant-absorbent mixtures leaving the first and the second low temperature heat exchangers in the vapor generator for concentration; and
(xii) reclaiming the heat from the hot water in a heat recovery unit.

26. The method as claimed in claim 17, wherein for achieving both heating and refrigeration under the condition of low temperature heat input, said method comprising the following:
(i) boiling a refrigerant-absorbent mixture in a vapor generator by using a low temperature heat input having temperature in the range of 90-170° C. for providing a concentrated absorbent and subsequently release refrigerant vapors;
(ii) cooling a first portion of the concentrated absorbent from the vapor generator in a first low temperature heat exchanger and a second portion of the concentrated absorbent in a second low temperature heat exchanger, providing a cooled concentrated absorbent;
(iii) condensing refrigerant vapors from vapor generator in the condenser by using hot water having temperature in the range of 45-90° C. providing condensed refrigerant and further heated water;
(iv) extracting heat from the condensed refrigerant in a flash heat exchanger providing a cooled condensed refrigerant;
(v) vaporizing the cooled condensed refrigerant from the flash heat exchanger in a high pressure evaporator by utilizing heat from water circulated therein, providing refrigerant vapors and refrigerant;
(vi) absorbing the refrigerant vapors released in the high pressure evaporator in the cooled concentrated absorbent sprayed in a high pressure absorber from the first low temperature heat exchanger, providing the refrigerant-absorbent mixture which is fed to the vapor generator and heat which is extracted by hot water leaving temperature in the range 50-98° C.;
(vii) vaporizing the refrigerant received in a low pressure evaporator from the high pressure evaporator by absorbing heat from water circulated therein, providing refrigerant vapors and refrigerant and water having temperature in the range of 0-35° C.;
(viii) absorbing the refrigerant vapors released in the low pressure evaporator in the cooled concentrated absorbent sprayed in a low pressure absorber from the second low temperature heat exchanger, providing the refrigerant-absorbent mixture which is fed to the vapor generator and heat which is absorbed by water circulated therein;
(ix) heating the refrigerant-absorbent mixtures leaving the high pressure absorber and the low pressure absorber in the flash heat exchanger, the first and the second low temperature heat exchanger providing a heated refrigerant-absorbent mixture;
(x) receiving the heated refrigerant-absorbent mixture in the vapor generator for concentration; and
(xi) reclaiming the heat from the hot water in a heat recovery unit.

27. The method as claimed in claim 17, wherein unused heat from the heat input fed to the vapor generator is reclaimed in the heat recovery unit.

* * * * *